US012593362B2

(12) United States Patent (10) Patent No.: US 12,593,362 B2
Geng et al. (45) Date of Patent: Mar. 31, 2026

(54) COMMUNICATIONS METHOD AND APPARATUS, AND COMPUTER-READABLE STORAGE MEDIUM

(71) Applicant: HUAWEI TECHNOLOGIES CO., LTD., Shenzhen (CN)

(72) Inventors: Tingting Geng, Shanghai (CN); Le Yan, Shenzhen (CN); Yinghao Jin, Shanghai (CN); Hongzhuo Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 646 days.

(21) Appl. No.: 17/342,619

(22) Filed: Jun. 9, 2021

(65) Prior Publication Data

US 2021/0298092 A1 Sep. 23, 2021

Related U.S. Application Data

(63) Continuation of application No. PCT/CN2019/123930, filed on Dec. 9, 2019.

(30) Foreign Application Priority Data

Dec. 10, 2018 (CN) .......................... 201811502034.5

(51) Int. Cl.
 H04W 76/11 (2018.01)
 H04W 12/0431 (2021.01)
 (Continued)

(52) U.S. Cl.
 CPC ........ H04W 76/11 (2018.02); H04W 12/0431 (2021.01); H04W 12/106 (2021.01); H04W 74/0833 (2013.01); H04W 74/0838 (2024.01)

(58) Field of Classification Search
 None
 See application file for complete search history.

(56) References Cited

U.S. PATENT DOCUMENTS 11,924,817 B2 * 3/2024 Wong .................. H04W 72/542
11,956,789 B2 * 4/2024 Alfarhan .............. H04L 5/0082
 (Continued)

FOREIGN PATENT DOCUMENTS

CN 101594666 A 12/2009
CN 103763748 A 4/2014
 (Continued)

OTHER PUBLICATIONS

Huawei, HiSilicon, Revisit of Stage 3 MAC spec in consideration of SUL, 3GPP TSG-RAN WG2 Meeting #100, R2-1713172, Reno, USA, Nov. 27-Dec. 1, 2017, 5 pages.
 (Continued)

*Primary Examiner* — Mariela Vidal Carpio

(57) ABSTRACT

This application provides a communications method and device, and a computer-readable storage medium. The method includes: receiving an uplink data transmission threshold from a first network device, where the uplink data transmission threshold includes both a first transmission threshold and a second transmission threshold or includes a second transmission threshold. The first transmission threshold is used to indicate a maximum size of a data packet supported by the terminal device in a non-connected state on a first uplink carrier, and the second transmission threshold is used to indicate a maximum size of a data packet supported by the terminal device in the non-connected state on a supplementary uplink (SUL) carrier. The method further comprises determining, based on the uplink data transmission threshold and a size of a to-be-transmitted uplink data packet, to transmit, in the non-connected state, the (Continued)

uplink data packet on the first uplink carrier or the SUL carrier.

21 Claims, 8 Drawing Sheets

(51) Int. Cl.
| | |
|---|---|
| *H04W 12/106* | (2021.01) |
| *H04W 74/0833* | (2024.01) |
| *H04W 74/0838* | (2024.01) |

(56) References Cited

U.S. PATENT DOCUMENTS

| | | | | |
|---|---|---|---|---|
| 11,963,030 | B2* | 4/2024 | Kim | H04W 24/10 |
| 2007/0002795 | A1* | 1/2007 | Bi | H04W 28/22 |
| | | | | 370/329 |
| 2015/0341823 | A1 | 11/2015 | Kanamarlapudi et al. | |
| 2018/0034736 | A1* | 2/2018 | Anchan | H04L 47/2433 |
| 2018/0324854 | A1 | 11/2018 | Phuyal et al. | |
| 2019/0174571 | A1* | 6/2019 | Deenoo | H04W 76/11 |
| 2019/0208411 | A1* | 7/2019 | Shrestha | H04W 74/0833 |
| 2020/0214070 | A1* | 7/2020 | Ingale | H04W 76/19 |
| 2020/0274657 | A1* | 8/2020 | Deenoo | H04L 5/0053 |
| 2020/0281022 | A1* | 9/2020 | Pelletier | H04W 52/367 |
| 2020/0288338 | A1* | 9/2020 | Freda | H04W 76/19 |
| 2020/0305186 | A1* | 9/2020 | Alfarhan | H04W 72/23 |
| 2020/0374966 | A1* | 11/2020 | Chang | H04W 74/0833 |
| 2020/0396654 | A1* | 12/2020 | Freda | H04W 36/06 |
| 2021/0152318 | A1* | 5/2021 | Park | H04L 5/0057 |
| 2021/0152350 | A1* | 5/2021 | Ai | H04W 76/19 |
| 2021/0176693 | A1* | 6/2021 | Ma | H04W 40/24 |
| 2021/0211945 | A1* | 7/2021 | Rugeland | H04W 76/16 |
| 2021/0243677 | A1* | 8/2021 | Li | H04L 5/001 |
| 2021/0352567 | A1* | 11/2021 | Kim | H04W 48/02 |
| 2022/0132622 | A1* | 4/2022 | Ahn | H04W 88/06 |
| 2022/0417804 | A1* | 12/2022 | Freda | H04W 36/0061 |

FOREIGN PATENT DOCUMENTS

| | | | |
|---|---|---|---|
| CN | 104105214 | A | 10/2014 |
| CN | 106464471 | A | 2/2017 |
| CN | 108055700 | A | 5/2018 |
| CN | 108521883 | A | 9/2018 |
| EP | 3783959 | A1 | 2/2021 |
| JP | 2011035860 | A | 2/2011 |
| JP | 2021510018 | A | 4/2021 |
| WO | 2018107711 | A1 | 6/2018 |
| WO | 2018214903 | A1 | 11/2018 |
| WO | 2019099361 | A1 | 5/2019 |
| WO | 2019099709 | A1 | 5/2019 |

OTHER PUBLICATIONS

Office Action issued in CN201811502034.5, dated Dec. 17, 2021, 8 pages.

Notice of Allowance issued in JP2021-532926 dated Mar. 28, 2023 with English translation, 5 pages.

International Search Report and Written Opinion issued in PCT/CN2019/123930 dated Mar. 11, 2020, 10 pages.

Extended European Search Report issued in EP19895012.3, dated Dec. 9, 2021, 7 pages.

Communication pursuant to Article 94(3) issued in EP19895012.3, dated Feb. 21, 2024, 7 pages.

Intel Corporation, Random Access in SUL. 3GPP TSG-RAN WG2 Meeting #100 , Reno, USA, Nov. 27-Dec. 1, 2017, R2-1712675, 2 pages.

Huawei, HiSilicon, Neul, PRACH partitioning for early data transmission. 3GPP TSG RAN WG2 Meeting #100, Reno, USA, Nov. 27-Dec. 1, 2017, R2-1713188, 20 pages.

OPPO, Discussion on RACH issue and UE capability for the SUL operation. 3GPP TSG-RAN2#100, Reno, USA, Nov. 27-Dec. 1, 2017, R2-1713946, 5 pages.

Intel Corporation, EDT when resuming in a new eNB. 3GPP TSG-WG2 Meeting #104 , Spokane, USA, Nov. 12-16, 2018, R2-1818654, 5 pages.

Office Action issued in JP2021-532926 with English translation, dated Aug. 23, 2022, 18 pages.

\* cited by examiner

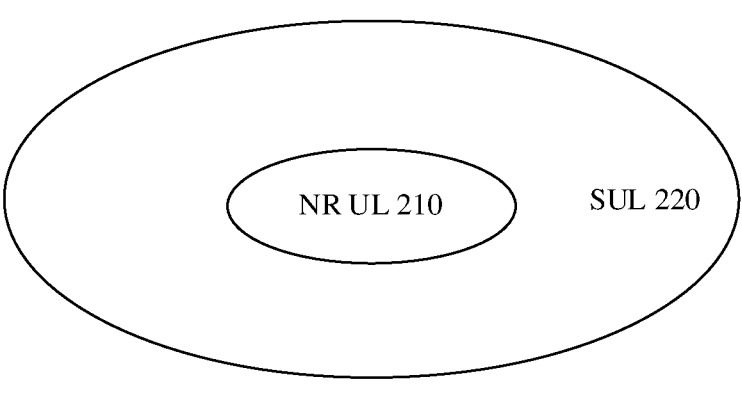
FIG. 2
A terminal device receives an uplink data transmission threshold from a first
communications device
310
The terminal device determines, based on the uplink data transmission threshold
and a size of a to-be-transmitted uplink data packet, to transmit, in a non-
connected state, the uplink data packet on a first uplink carrier or an SUL carrier
320
FIG. 3
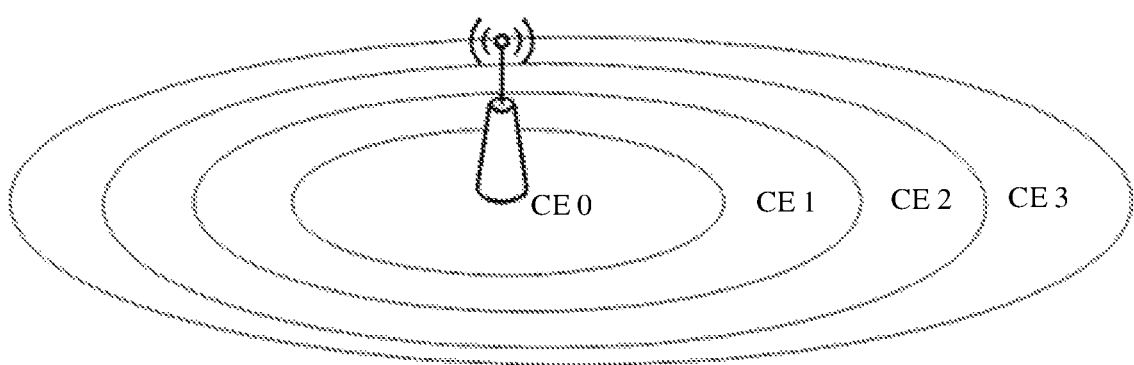
FIG. 4

Communications apparatus 900

Receiving module 910

Determining module 920

COMMUNICATIONS METHOD AND APPARATUS, AND COMPUTER-READABLE STORAGE MEDIUM

CROSS-REFERENCE TO RELATED APPLICATIONS

This application is a continuation of International Application No. PCT/CN2019/123930, filed on Dec. 9, 2019, which claims priority to Chinese Patent Application No. 201811502034.5, filed on Dec. 10, 2018. The disclosures of the aforementioned applications are hereby incorporated by reference in their entireties.

TECHNICAL FIELD

This application relates to the communications field, and more specifically, to a communications method, an apparatus and a computer-readable storage medium for uplink data transmission.

BACKGROUND

In a process in which a terminal device communicates with a network device, there may be a case in which coverage of an uplink (UL) carrier is smaller than coverage of a downlink (DL) carrier. A low-frequency supplementary uplink (SUL) carrier is introduced to enable the coverage of the UL carrier to be consistent with the coverage of the DL carrier. One cell includes at least one first uplink carrier and at least one SUL carrier, a frequency of the first uplink carrier is higher than a frequency of the SUL carrier, and coverage of the SUL carrier is relatively consistent with coverage of the DL carrier.

In a conventional technology, in an SUL carrier scenario in a fifth generation mobile communications technology standard, no solution is provided about a mechanism of how to quickly transmit an uplink data packet of a terminal device in the SUL scenario.

Therefore, in the SUL carrier scenario, how to quickly transmit the uplink data packet becomes an urgent problem to be resolved currently.

SUMMARY

This application provides a communications method, an apparatus, and a computer-readable storage medium, to quickly transmit an uplink data packet in an SUL carrier scenario.

According to an example embodiment of a first aspect, a communications method is provided, including: receiving an uplink data transmission threshold from a first network device, where the uplink data transmission threshold includes a first transmission threshold and a second transmission threshold or includes a second transmission threshold; and determining, based on the uplink data transmission threshold and a size of a to-be-transmitted uplink data packet, to transmit, in a non-connected state, the uplink data packet on a first uplink carrier or an SUL carrier of the first network device.

The first network device in this embodiment may be understood as a target base station.

In this embodiment, the first transmission threshold is used to indicate a maximum size of a data packet supported by a terminal device in the non-connected state on the first uplink carrier. The second transmission threshold is used to indicate a maximum size of a data packet supported by the terminal device in the non-connected state on the supplementary uplink (SUL) carrier. A frequency of the first uplink carrier is higher than that of the SUL carrier, and the first uplink carrier may be, for example, a new radio uplink (NR UL) carrier.

In this embodiment, the uplink data packet can be quickly transmitted in an SUL carrier scenario.

With reference to the first aspect, in some embodiments of the first aspect, the second transmission threshold is greater than the first transmission threshold, and when the size of the to-be-transmitted uplink data packet is greater than the first transmission threshold and less than the second transmission threshold, the terminal device determines to transmit, in the non-connected state, the uplink data packet on the SUL carrier of the first network device.

With reference to the first aspect, in some embodiments of the first aspect, when the size of the to-be-transmitted uplink data packet is less than a smaller one of the first transmission threshold and the second transmission threshold, the terminal device transmits the uplink data packet in the non-connected state on the first uplink carrier or the SUL carrier of the first network device.

With reference to the first aspect, in some embodiments of the first aspect, when the size of the to-be-transmitted uplink data packet is less than a smaller one of the first transmission threshold and the second transmission threshold, it is determined to transmit, in the non-connected state, the uplink data packet on the first uplink carrier or the SUL carrier of the first network device.

With reference to the first aspect, in some embodiments of the first aspect, the terminal device receives a downlink signal quality threshold from the first network device; and the terminal device determines, based on the downlink signal quality threshold, to transmit, in the non-connected state, the uplink data packet on the first uplink carrier or the SUL carrier of the first network device.

With reference to the first aspect, in some embodiments of the first aspect, the terminal device determines to send, in the non-connected state, the uplink data packet by using a random access procedure.

With reference to the first aspect, in some embodiments of the first aspect, the terminal device determines to send, in the non-connected state, a message 1 and the to-be-transmitted uplink data packet; or determines to send, in the non-connected state, a message 3 and the to-be-transmitted uplink data packet; or determines to send, in the non-connected state, a message 3, where the message 3 carries the to-be-transmitted uplink data packet; or determines to send, in the non-connected state, a message 5 and the to-be-transmitted uplink data packet; or determines to send, in the non-connected state, a message 5, where the message 5 carries the to-be-transmitted uplink data packet.

With reference to the first aspect, in some embodiments of the first aspect, the method further includes: The terminal device receives first indication information from the first network device, where the first indication information is used to indicate the terminal device to transmit, in the non-connected state, the uplink data packet by using a first key, and the first key is a key determined by the terminal device based on at least one of the following information:

a key used by the terminal device for a second network device, where the second network device is a source network device that configures the terminal device to enter the non-connected state;

US 12,593,362 B2

3 cell information of the first network device, where the cell information includes frequency channel number information and/or a physical cell identifier of a cell of the first network device, and the first network device is a target network device to which the terminal device performs random access; and a next hop chaining count (NCC) value.

In this embodiment, the terminal device may transmit the uplink data packet by using a key related to a source base station. In this way, signaling overheads and a relatively large data transmission delay that are caused by a change of an anchor base station can be avoided for the terminal device in an inactive state.

With reference to the first aspect, in some embodiments of the first aspect, the method further includes: The terminal device receives a random access configuration from the first network device. The terminal device determines to transmit, in the non-connected state, the uplink data packet on the first uplink carrier or the SUL carrier of the first network device based on the random access configuration.

With reference to the first aspect, in some embodiments of the first aspect, the random access configuration includes at least one of the following: random access preamble information and a random access resource.

With reference to the first aspect, in some embodiments of the first aspect, the random access configuration includes at least one random access configuration corresponding to at least one coverage enhancement level.

With reference to the first aspect, in some embodiments of the first aspect, the uplink data transmission threshold includes at least one uplink data transmission threshold corresponding to the at least one coverage enhancement level.

In this embodiment, the foregoing different CE levels may correspond to different maximum quantities of repetition times and/or modulation schemes of data transmission, to achieve a balance between coverage and a capacity.

With reference to the first aspect, in some embodiments of the first aspect, the method further includes: The terminal device receives third indication information from the first network device, where the third indication information is used to indicate the terminal device to receive a to-be-transmitted downlink data packet. The terminal device determines, based on the third indication information, to receive, in the non-connected state, the to-be-transmitted downlink data packet from the first network device.

With reference to the first aspect, in some embodiments of the first aspect, the method further includes: The terminal device receives fourth indication information from the first network device, where the fourth indication information is used to indicate the terminal device to decrypt the downlink data packet by using the first key.

According to an example embodiment of a second aspect, a communications method is provided, including: A first network device sends an uplink data transmission threshold to a terminal device, where the uplink data transmission threshold includes a first transmission threshold and a second transmission threshold or includes a second transmission threshold, the first transmission threshold is used to indicate a maximum size of a data packet supported by the terminal device in a non-connected state on a first uplink carrier, the second transmission threshold is used to indicate a maximum size of a data packet supported by the terminal device in the non-connected state on a supplementary uplink (SUL) carrier, and a frequency of the first uplink carrier is higher than that of the SUL carrier. The first network device receives, on the first uplink carrier or the SUL carrier, the uplink data packet transmitted by the terminal device in the non-connected state.

In this embodiment, the uplink data packet can be quickly transmitted in an SUL carrier scenario.

With reference to the second aspect, in some embodiments of the second aspect, the method further includes: The first network device sends a downlink signal quality threshold to the terminal device, where the downlink signal quality threshold is used by the terminal device to determine to transmit, in the non-connected state, the uplink data packet on the first uplink carrier or the SUL carrier.

With reference to the second aspect, in some embodiments of the second aspect, the method further includes: The first network device sends a random access configuration to the terminal device, where the random access configuration is used by the terminal device to transmit, in the non-connected state, the uplink data packet on the first uplink carrier or the SUL carrier based on the random access configuration.

With reference to the second aspect, in some embodiments of the second aspect, the random access configuration includes at least one of the following: random access preamble information and a random access resource.

With reference to the second aspect, in some embodiments of the second aspect, the random access configuration includes at least one random access configuration corresponding to at least one coverage enhancement level.

In this embodiment, the foregoing different CE levels may correspond to different maximum quantities of repetition times and/or modulation schemes of data transmission, to achieve a balance between coverage and a capacity.

With reference to the second aspect, in some embodiments of the second aspect, the method further includes: The first network device sends second indication information to the terminal device, where the second indication information is used to indicate the terminal device to quickly transmit, in the non-connected state, the uplink data packet by using a first key.

The first key in this embodiment may be a key determined by the terminal device based on at least one of the following information: a key used by the terminal device for the second network device, where the second network device is a source network device that configures the terminal device to enter the non-connected state; cell information of the first network device, where the cell information includes frequency channel number information and/or a physical cell identifier of a cell of the first network device, and the first network device is a target network device to which the terminal device performs random access; and a next hop chaining count (NCC) value.

In this embodiment, the terminal device may quickly transmit the uplink data packet by using a key related to a source base station. In this way, signaling overheads and a relatively large data transmission delay that are caused by a change of an anchor base station can be avoided for the terminal device in an inactive state.

With reference to the second aspect, in some embodiments of the second aspect, the method further includes: The first network device receives a second message sent by the second network device, where the second message includes a receiving address of the uplink data packet. The first network device forwards to the second network device, based on the receiving address, the received uplink data packet quickly transmitted by the terminal device.

With reference to the second aspect, in some embodiments of the second aspect, before that the first network device receives a second message sent by the second network device, the method further includes: The first network device sends a first message to the second network device, where the first message includes third indication information, the third indication information is used to indicate the second network device to send the receiving address, or is used to indicate that the terminal device quickly transmits the uplink data packet by using the first key, and the receiving address is an address used by the first network device to send, to the second network device, the uplink data packet transmitted by the terminal device in the non-connected state.

According to an example embodiment of a third aspect, a communications method is provided, including: A second network device receives a to-be-transmitted uplink data packet sent by a first network device. The second network device receives third indication information sent by the first network device, where the third indication information is used to indicate that the to-be-transmitted uplink data packet is an uplink data packet sent by a terminal device in a non-connected state on a first uplink carrier or a supplementary uplink (SUL) carrier.

In this embodiment, the uplink data packet can be quickly transmitted in an SUL carrier scenario.

With reference to the third aspect, in some embodiments of the third aspect, the method further includes: The second network device determines, based on a downlink data transmission threshold and a size of a to-be-transmitted downlink data packet, that the to-be-transmitted downlink data packet needs to be sent to the first network device, where the to-be-transmitted downlink data packet is a downlink data packet that needs to be directly sent by the first network device to the terminal device in the non-connected state. The second network device sends the to-be-transmitted downlink data packet to the first network device.

With reference to the third aspect, in some embodiments of the third aspect, before that the second network device sends the to-be-transmitted downlink data packet to the first network device, the method further includes: The second network device sends fifth indication information to the first network device, where the fifth indication information is used to indicate the first network device to send a receiving address of the downlink data packet.

With reference to the third aspect, in some embodiments of the third aspect, the method further includes: The second network device sends sixth indication information to the first network device, where the sixth indication information is used to indicate that the terminal device has the to-be-received downlink data packet in the non-connected state.

With reference to the third aspect, in some embodiments of the third aspect, the method further includes: The second network device sends seventh indication information to the first network device, where the seventh indication information is used to indicate that the terminal device decrypts the downlink data packet by using a first key, and the first key is a key determined by the terminal device based on at least one of the following information:

a key used by the terminal device for the second network device, where the second network device is a source network device that configures the terminal device to enter the non-connected state;

cell information of the first network device, where the cell information includes frequency channel number information and/or a physical cell identifier of a cell of the first network device, and the first network device is a target network device to which the terminal device performs random access; and a next hop chaining count (NCC) value.

In this embodiment, the terminal device may quickly transmit the uplink data packet by using a key related to a source base station. In this way, signaling overheads and a relatively large data transmission delay that are caused by a change of an anchor base station can be avoided for the terminal device in an inactive state.

According to an example embodiment of a fourth aspect, a communications method is provided, including: A second network device determines, based on a downlink data transmission threshold and a size of a to-be-transmitted downlink data packet, that the to-be-transmitted downlink data packet needs to be sent to the first network device, where the to-be-transmitted downlink data packet is a downlink data packet that needs to be directly sent by the first network device to the terminal device in a non-connected state. The second network device sends the to-be-transmitted downlink data packet to the first network device.

With reference to the fourth aspect, in some embodiments of the fourth aspect, the method further includes: The second network device sends sixth indication information to the first network device, where the sixth indication information is used to indicate that the terminal device has the to-be-received downlink data packet in the non-connected state.

With reference to the fourth aspect, in some embodiments of the fourth aspect, the method further includes:

The second network device sends seventh indication information to the first network device, where the seventh indication information is used to indicate that the terminal device decrypts the downlink data packet by using a first key, and the first key is a key determined by the terminal device based on at least one of the following information:

a key used by the terminal device for the second network device, where the second network device is a source network device that configures the terminal device to enter the non-connected state;

cell information of the first network device, where the cell information includes frequency channel number information and/or a physical cell identifier of a cell of the first network device, and the first network device is a target network device to which the terminal device performs random access; and a next hop chaining count (NCC) value.

According to an example embodiment of a fifth aspect, a communications apparatus is provided, including a module, a component, or a circuit configured to implement the method in the first aspect.

It may be understood that the communications apparatus in the fifth aspect may be a terminal device, or may be a component (for example, a chip or a circuit) that can be used for a terminal device.

According to an example embodiment of a sixth aspect, a communications apparatus is provided, including a module, a component, or a circuit configured to implement the method in the second aspect.

It may be understood that the communications apparatus in the sixth aspect may be a network device, or may be a component (for example, a chip or a circuit) that can be used for a network device.

According to an example embodiment of a seventh aspect, a communications apparatus is provided, including a module, a component, or a circuit configured to implement the method in the third aspect.

It may be understood that the communications apparatus in the seventh aspect may be a network device, or may be a component (for example, a chip or a circuit) that can be used for a network device.

According to an example embodiment of an eighth aspect, a communications apparatus is provided, including a module, a component, or a circuit configured to implement the method in the fourth aspect.

It may be understood that the communications apparatus in the eighth aspect may be a network device, or may be a component (for example, a chip or a circuit) that can be used for a network device.

According to an example embodiment of a ninth aspect, a communications apparatus is provided, and includes a memory, a processor, and a transceiver.

The processor may be communicatively connected to the transceiver. The memory may be configured to store program code and data of the communications apparatus. Therefore, the memory may be a storage unit in the processor, an external storage unit independent of the processor, or a component including a storage unit in the processor and an external storage unit independent of the processor.

Optionally, the processor may be a general-purpose processor, and may be implemented by using hardware or software. When the processor is implemented by using the hardware, the processor may be a logic circuit, an integrated circuit, or the like. When the processor is implemented by using the software, the processor may be a general-purpose processor, and is implemented by reading software code stored in a memory. The memory may be integrated into the processor, or may be located outside the processor and exist independently.

When a program is executed, the processor performs, by using the transceiver, the method in any one of the first aspect or the embodiments of the first aspect.

According to an example embodiment of a tenth aspect, a communications apparatus is provided, and includes a memory, a processor, and a transceiver.

The processor may be communicatively connected to the transceiver. The memory may be configured to store program code and data of the communications apparatus. Therefore, the memory may be a storage unit in the processor, an external storage unit independent of the processor, or a component including a storage unit in the processor and an external storage unit independent of the processor.

Optionally, the processor may be a general-purpose processor, and may be implemented by using hardware or software. When the processor is implemented by using the hardware, the processor may be a logic circuit, an integrated circuit, or the like. When the processor is implemented by using the software, the processor may be a general-purpose processor, and is implemented by reading software code stored in a memory. The memory may be integrated into the processor, or may be located outside the processor and exist independently.

When a program is executed, the processor performs, by using the transceiver, the method in any one of the second aspect or the embodiments of the second aspect.

According to an example embodiment of an eleventh aspect, a communications apparatus is provided, and includes a memory, a processor, and a transceiver.

The processor may be communicatively connected to the transceiver. The memory may be configured to store program code and data of the communications apparatus. Therefore, the memory may be a storage unit in the processor, an external storage unit independent of the processor, or a component including a storage unit in the processor and an external storage unit independent of the processor.

Optionally, the processor may be a general-purpose processor, and may be implemented by using hardware or software. When the processor is implemented by using the hardware, the processor may be a logic circuit, an integrated circuit, or the like. When the processor is implemented by using the software, the processor may be a general-purpose processor, and is implemented by reading software code stored in a memory. The memory may be integrated into the processor, or may be located outside the processor and exist independently.

When a program is executed, the processor performs, by using the transceiver, the method in any one of the third aspect or the embodiments of the third aspect.

According to an example embodiment of a twelfth aspect, a communications apparatus is provided, and includes a memory, a processor, and a transceiver.

The processor may be communicatively connected to the transceiver. The memory may be configured to store program code and data of the communications apparatus. Therefore, the memory may be a storage unit in the processor, an external storage unit independent of the processor, or a component including a storage unit in the processor and an external storage unit independent of the processor.

Optionally, the processor may be a general-purpose processor, and may be implemented by using hardware or software. When the processor is implemented by using the hardware, the processor may be a logic circuit, an integrated circuit, or the like. When the processor is implemented by using the software, the processor may be a general-purpose processor, and is implemented by reading software code stored in a memory. The memory may be integrated into the processor, or may be located outside the processor and exist independently.

When a program is executed, the processor performs, by using the transceiver, the method in any one of the fourth aspect or the embodiments of the fourth aspect.

According to an example embodiment of a thirteenth aspect, a computer-readable storage medium is provided, including a computer program. When the computer program is run on a communications apparatus, the communications apparatus is enabled to perform the method in any one of the first aspect or the embodiments of the first aspect.

According to an example embodiment of a fourteenth aspect, a computer-readable storage medium is provided, including a computer program. When the computer program is run on a communications apparatus, the communications apparatus is enabled to perform the method in any one of the second aspect or the embodiments of the second aspect.

According to an example embodiment of a fifteenth aspect, a computer-readable storage medium is provided, including a computer program. When the computer program is run on a communications apparatus, the communications apparatus is enabled to perform the method in any one of the third aspect or the embodiments of the third aspect.

According to an example embodiment of a sixteenth aspect, a computer-readable storage medium is provided, including a computer program. When the computer program is run on a communications apparatus, the communications apparatus is enabled to perform the method in any one of the fourth aspect or the embodiments of the fourth aspect.

According to an example embodiment of a seventeenth aspect, a computer program product is provided. When the computer program product runs on a computer, the computer is enabled to perform the method in any one of the first aspect or the embodiments of the first aspect.

According to an example embodiment of an eighteenth aspect, a computer program product is provided. When the computer program product runs on a computer, the computer is enabled to perform the method in any one of the second aspect or the embodiments of the second aspect.

According to an example embodiment of a nineteenth aspect, a computer program product is provided. When the computer program product runs on a computer, the computer is enabled to perform the method in any one of the third aspect or the embodiments of the third aspect.

According to an example embodiment of a twentieth aspect, a computer program product is provided. When the computer program product runs on a computer, the computer is enabled to perform the method in any one of the fourth aspect or the embodiments of the fourth aspect.

BRIEF DESCRIPTION OF DRAWINGS

FIG. 2 is a schematic diagram of an example application scenario according to an embodiment of this application;

FIG. 3 is a schematic flowchart of a communications method according to an embodiment of this application;

FIG. 4 is a schematic diagram of a CE level according to an embodiment of this application;

DESCRIPTION OF EMBODIMENTS

Figure 1:
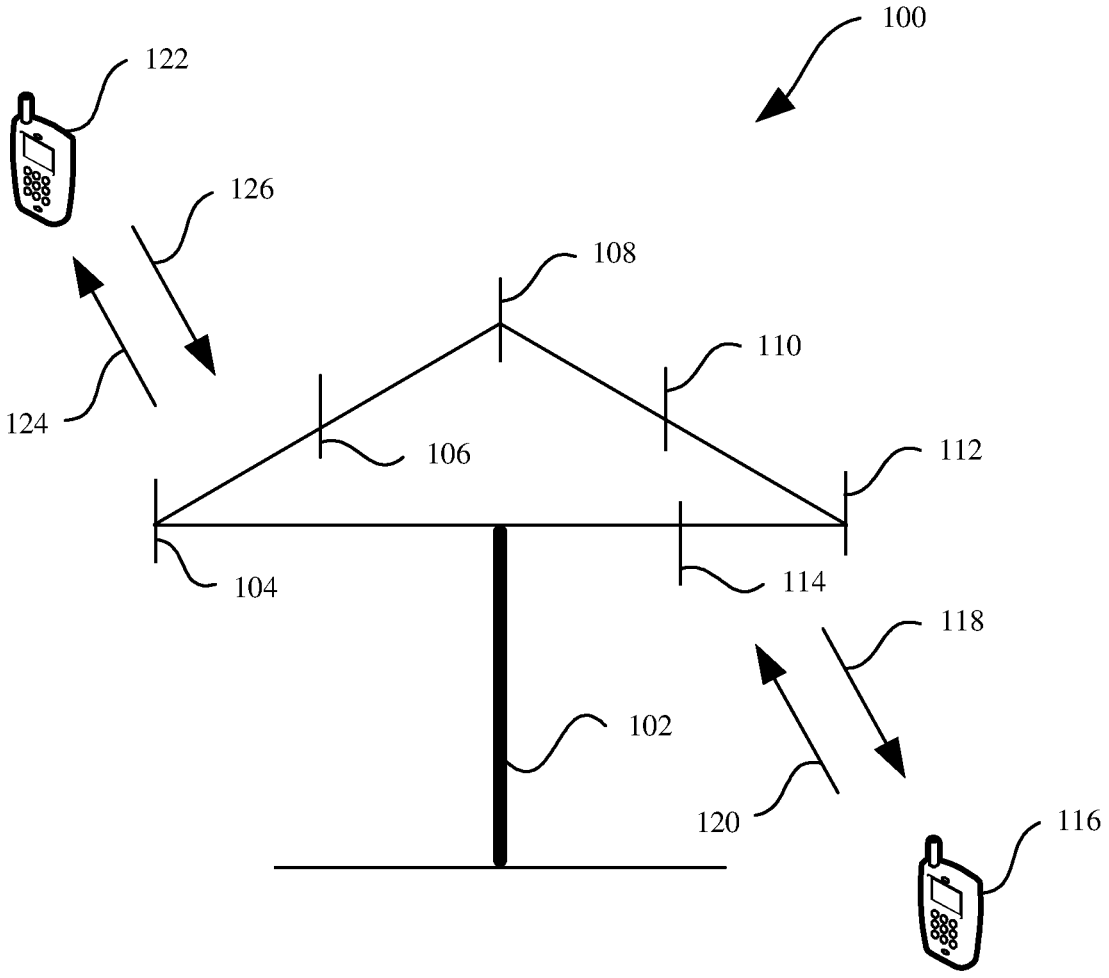
FIG. 1 is a schematic diagram of a scenario of a communications system 100 to which embodiments of this application are applicable.

The following describes the technical solutions in this application with reference to the accompanying drawings.

It should be understood that, the technical solutions of embodiments of this application may be applied to various communications systems, such as: a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or a new radio (NR) system.

A type of a terminal device is not specifically limited in the embodiments of this application. For example, the terminal device may be user equipment (UE), an access terminal, a subscriber unit, a subscriber station, a mobile station, a mobile console, a remote station, a remote terminal, a mobile device, a user terminal, a wireless network device, a user agent, or a user apparatus. The terminal device may include but is not limited to a mobile station (MS), a mobile phone, user equipment (UE), a handset, portable equipment, a cellular phone, a cordless phone, a session initiation protocol (SIP) phone, a wireless local loop (WLL) station, a personal digital assistant (PDA), a radio frequency identification (RFID) terminal device used for logistics, a handheld device or a computing device with a wireless communication function, another device connected to a wireless modem, a vehicle-mounted device, a wearable device, a terminal device in the internet of things or the internet of vehicles, a terminal device in a 5G network, a terminal device in a future evolved public land mobile network (PLMN), or the like.

As an example instead of a limitation, in the embodiments of this application, the terminal device may alternatively be a wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that can be directly worn on a body or integrated into clothes or an accessory of a user. The wearable device is not only a hardware device, but implements powerful functions through software support, data exchange, and cloud interaction. Generalized wearable intelligent devices include full-featured and large-size devices that can implement complete or partial functions without depending on smartphones, for example, smartwatches or smart glasses, and devices that focus on only one type of application function and need to work with other devices such as smartphones, for example, various smart bands or smart jewelry for monitoring physical signs.

A type of a network device is not specifically limited in the embodiments of this application. The network device may be any device configured to communicate with the terminal device. For example, the network device may be a base transceiver station (BTS) in a global system for mobile communications (GSM) system or a code division multiple access (CDMA) system, a NodeB (NB) in a wideband code division multiple access (WCDMA) system, an evolved NodeB (eNB or eNodeB) in a long term evolution (LTE) system, or a radio controller in a cloud radio access network (CRAN) scenario. Alternatively, the network device may be, for example, a relay station, an access point, a vehicle-mounted device, a wearable device, a network device in a future 5G network, or a network device in a future evolved PLMN.

In an example embodiment, the network device may include a central unit (CU) and a distributed unit (DU). One CU may be connected to one DU, or a plurality of DUs may share one CU, to reduce costs and facilitate network expansion. The CU and the DU may be split based on a protocol stack. In an example embodiment, a radio resource control (RRC) layer, a service data adaptation protocol (SDAP) layer, and a packet data convergence protocol (PDCP) layer are deployed on the CU, and a remaining radio link control (RLC) layer, media access control (MAC) layer, and physical layer are deployed on the DU.

In addition, in the embodiments of this application, the network device provides a service for a cell, and the terminal device communicates with the network device by using a transmission resource (for example, a frequency domain resource, namely, a spectrum resource) used in the cell. The cell may be a cell corresponding to the network device (for example, a base station). The cell may belong to a macro base station, or may belong to a base station corresponding to a small cell. The small cell herein may include a metro cell, a micro cell, a pico cell, a femto cell, and the like. These small cells are characterized by small coverage and low transmit power, and are applicable to providing a high-rate data transmission service.

A method provided in the embodiments of this application may be applied to the terminal device or the network device. The terminal device or the network device includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). The operating system may be any one or more of computer operating systems implementing service processing through a process, for example, a Linux operating system, a Unix operating system, an Android operating system, an iOS operating system, and a Windows operating system. The application layer includes applications such as a browser, an address book, word processing software, and instant communications software. In addition, in the embodiments of this application, a specific structure of an entity for performing a signal transmission method is not specially limited in the embodiments of this application, provided that the entity can run a program recording code of the signal transmission method in the embodiments of this application, to perform communication based on the signal transmission method in the embodiments of this application. For example, a wireless communications method in the embodiments of this application may be performed by a terminal device or a network device, or a functional module that is in a terminal device or a network device and that can invoke a program and execute the program.

In addition, aspects or features in the embodiments of this application may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk or a magnetic tape), an optical disc (for example, a compact disc (CD) and a digital versatile disc (DVD)), a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry instructions and/or data.

FIG. 1 is a schematic diagram of a scenario of a communications system 100 to which embodiments of this application are applicable. As shown in FIG. 1, the communications system 100 includes a network device 102, and the network device 102 may include a plurality of antenna groups. Each antenna group may include a plurality of antennas. For example, one antenna group may include antennas 104 and 106, another antenna group may include antennas 106 and 110, and an additional group may include antennas 112 and 114. FIG. 1 shows two antennas for each antenna group, but each group may include more or fewer antennas. The network device 102 may additionally include a transmitter chain and a receiver chain, and a person of ordinary skill in the art may understand that both the transmitter chain and the receiver chain may include a plurality of components (for example, a processor, a modulator, a multiplexer, a demodulator, a demultiplexer, and an antenna) related to signal sending and receiving.

The network device 102 may communicate with a plurality of terminal devices (for example, a terminal device 116 and a terminal device 122). However, it may be understood that the network device 102 may communicate with any quantity of terminal devices that are similar to the terminal device 116 or 122. The terminal devices 116 and 122 each may be, for example, a cellular phone, a smartphone, a portable computer, a handheld communications device, a handheld computing device, a satellite radio apparatus, a global positioning system, a PDA, and/or any other proper device configured to perform communication in the wireless communications system 100.

As shown in FIG. 1, the terminal device 116 communicates with the antennas 112 and 114. The antennas 112 and 114 send information to the terminal device 116 through a forward link 118, and receive information from the terminal device 116 through a reverse link 120. In addition, the terminal device 122 communicates with the antennas 104 and 106. The antennas 104 and 106 send information to the terminal device 122 through a forward link 124, and receive information from the terminal device 122 through a reverse link 126.

For example, in a frequency division duplex (FDD) system, for example, the forward link 118 may use a frequency band different from that used by the reverse link 120, and the forward link 124 may use a frequency band different from that used by the reverse link 126.

For another example, in a time division duplex (TDD) system and a full duplex system, the forward link 118 and the reverse link 120 may use a same frequency band, and the forward link 124 and the reverse link 126 may use a same frequency band.

Each antenna group and/or area designed for communication is referred to as a sector of the network device 102. For example, an antenna group may be designed to communicate with a terminal device in the sector within coverage of the network device 102. In a process in which the network device 102 communicates with the terminal devices 116 and 122 respectively through the forward links 118 and 124, a transmit antenna of the network device 102 may improve signal-to-noise ratios of the forward links 118 and 124 through beamforming. In addition, in comparison with a manner in which the network device sends, through a single antenna, a signal to all terminal devices served by the network device, in this case, when the network device 102 sends, through beamforming, a signal to the terminal devices 116 and 122 that are randomly distributed within related coverage, less interference is caused to a mobile device in a neighboring cell.

In a given time, the network device 102, the terminal device 116, or the terminal device 122 may be a wireless communications sending apparatus and/or a wireless communications receiving apparatus. When sending data, the wireless communications sending apparatus may encode data for transmission. Specifically, the wireless communications sending apparatus may obtain (for example, generate, receive from another communications apparatus, or store in a memory) a specific quantity of data bits to be sent on a channel to the wireless communications receiving apparatus. The data bits may be included in a transport block (or a plurality of transport blocks) of the data, and the transport block may be segmented to generate a plurality of code blocks.

In addition, the communications system 100 may be a public land mobile network PLMN network, a device-to-device (D2D) network, a machine-to-machine (M2M) network, or another network. FIG. 1 is merely an example of a simplified schematic diagram for ease of understanding, and the network may further include another network device that is not shown in FIG. 1.

In a process in which the terminal device communicates with the network device, in a high-frequency scenario in which an uplink carrier of the terminal device belongs to a high frequency band, due to factors such as power or a transmit/receive antenna of the terminal device, coverage of the uplink (UL) carrier of the terminal device may be smaller than coverage of a downlink (DL) carrier of the network device. In an example, because UL power of the terminal device is usually less than DL power of the network device, the coverage of the UL carrier of the terminal device may be smaller than the coverage of the DL carrier of the network device. In another example, because a quantity of transmit/receive antennas of the terminal device is less than a quantity of transmit/receive antennas of the network device, the coverage of the UL carrier of the terminal device may be smaller than the coverage of the DL carrier of the network device.

Optionally, a high-frequency band spectrum includes a centimeter wave frequency band and a millimeter wave frequency band. The centimeter wave frequency band may include, for example, a spectrum in a range of 3 GHz to 30 GHz, and the millimeter wave frequency band may include, for example, a spectrum in a range of 30 GHz to 300 GHz.

A low-frequency supplementary uplink (SUL) carrier is introduced to enable the coverage of the UL carrier to be the same as the coverage of the DL carrier. One cell includes at least one first link carrier and at least one SUL carrier, a frequency of the first link carrier is higher than a frequency of the SUL carrier, and coverage of the SUL carrier is relatively consistent with the coverage of the DL carrier.

An example in which the first link carrier is a new radio uplink (NR UL) is used. FIG. 2 is a schematic diagram of a possible application scenario according to an embodiment of this application. The scenario shown in FIG. 2 may include an NR UL 210 and an SUL 220. A frequency of the NR UL 210 is higher than a frequency of the SUL 220.

When a terminal device is in a non-connected state, the terminal device may quickly send a to-be-transmitted uplink data packet to a target base station when the terminal device does not need to enter a connected state or before the terminal device enters a connected state.

It should be understood that a status of the terminal device may include an active state, an inactive state, an idle state, or an enhanced idle state (in the enhanced idle state, an access network device stores context information of the terminal device, and/or a core network device stores context information of the terminal device). The active state may also be referred to as a connected state, and other states each may be referred to as a non-connected state.

The inactive state above may be understood as an energy saving state of the terminal device. In the inactive state, an RRC connection between the terminal device and a network device is released, and the terminal device and the network device that configures the terminal device to enter the inactive state may reserve an access stratum context and/or a non-access stratum context of the terminal device. It may be understood that the inactive state may also be referred to as a deactivation state.

Optionally, for descriptions of the inactive state, the active state, and the enhanced idle state, refer to definitions in TS38.300 v15.3.0. Details are not repeated herein.

It should be noted that quick uplink data packet transmission may be understood as that the terminal device transmits the uplink data packet in the non-connected state. It may be understood that quick uplink data packet transmission may also be referred to as direct uplink data packet transmission.

Currently, no solution is provided about a mechanism of how to quickly transmit the uplink data packet of the terminal device in an SUL carrier scenario.

According to the communications method provided in the embodiments of this application, the terminal device can quickly transmit a data packet in the SUL carrier scenario.

It may be understood that in the embodiments of this application, the terminal device and/or the network device may perform some or all steps in the embodiments of this application. These steps or operations are merely examples. In the embodiments of this application, other operations or variations of various operations may be further performed. In addition, the steps may be performed in a sequence different from that presented in the embodiments of this application, and not all the operations in the embodiments of this application are necessarily performed.

FIG. 3 is a schematic flowchart of a communications method according to an embodiment of this application. The method shown in FIG. 3 may include steps 310 and 320. The following describes steps 310 and 320 in detail.

Step 310: A terminal device receives an uplink data transmission threshold from a first network device.

In this embodiment, the first network device may be a base station to which the terminal device currently belongs, and the first network device may also be referred to as a target base station.

In step 310 of this embodiment, the terminal device is in a non-connected state.

The uplink data transmission threshold in this embodiment may include both a first transmission threshold and a second transmission threshold or include only a second transmission threshold. The first transmission threshold is used to indicate a maximum size of a data packet supported by the terminal device in the non-connected state on a first uplink carrier, and the second transmission threshold is used to indicate a maximum size of a data packet supported by the terminal device in the non-connected state on a supplementary uplink (SUL) carrier.

It may be understood that, refer to FIG. 2, the maximum sizes of data packets for UL quick transmission, supported by different UL carrier frequencies, may be different, or may be the same. This is not limited in embodiments of the present disclosure.

In an example embodiment, when the maximum sizes of the data packets for UL quick transmission, supported by the different UL carrier frequencies, are the same, the first transmission threshold and the second transmission threshold may be represented by using only one common transmission threshold.

In another example embodiment, the first transmission threshold is less than the second transmission threshold. For example, because the first uplink (for example, an NR UL 210) carrier has relatively small coverage, if supporting quick transmission of a relatively large uplink data packet, UL coverage of the first uplink carrier is smaller. However, an SUL 220 has large coverage, and therefore may support quick transmission of a larger uplink data packet.

It should be understood that, in an example, the first network device may send the first transmission threshold and the second transmission threshold in a broadcast manner. For example, the network device may send the first transmission threshold and the second transmission threshold to the terminal device by using a system message.

Step 320: The terminal device determines, based on the uplink data transmission threshold and a size of a to-be-transmitted uplink data packet, to transmit, in the non-connected state, the uplink data packet on the first uplink carrier or the SUL carrier.

In this embodiment, the terminal device may determine, based on the size of the to-be-transmitted uplink data packet and the uplink data transmission threshold, the first uplink carrier or the SUL carrier on which the uplink data packet is quickly transmitted in the non-connected state.

An example in which the first transmission threshold is less than the second transmission threshold is used. If it is determined that the size of the to-be-transmitted uplink data packet is greater than the second transmission threshold, the terminal device may be configured to be in a connected state, and then perform data transmission. In other words, when the size of the to-be-transmitted uplink data packet is relatively large, the quick transmission solution in this embodiment may not be used. In another example, if it is determined that the size of the to-be-transmitted uplink data packet is less than the second transmission threshold but greater than the first transmission threshold, the terminal device may quickly transmit the uplink data packet on the SUL carrier. In another example, if the size of the to-be-transmitted uplink data packet is less than the first transmission threshold, the terminal device may quickly transmit the uplink data packet on the first uplink carrier, or may quickly transmit the uplink data packet on the SUL carrier.

For example, a quick transmission threshold of UL data of an NR UL is 50 bits, and a quick transmission threshold of UL data of an SUL carrier is 100 bits. If a size of an uplink data packet to be transmitted by the terminal device is less than 50 bits, the terminal device may quickly transmit the uplink data packet on the NR UL or the SUL. If a size of an uplink data packet to be transmitted by the terminal device is 80 bits, which is greater than 50 bits but less than 100 bits, the terminal device may choose to quickly transmit the uplink data packet on the SUL.

An example in which the first transmission threshold is greater than the second transmission threshold is used. If it is determined that the size of the to-be-transmitted uplink data packet is greater than the first transmission threshold, the terminal device may be configured to be in a connected state, and then perform data transmission. In other words, when the to-be-transmitted uplink data packet is relatively large, the quick transmission solution in this embodiment may not be used. In another example, if it is determined that the size of the to-be-transmitted uplink data packet is less than the first transmission threshold but greater than the second transmission threshold, the terminal device may quickly transmit the uplink data packet on the first uplink carrier. In another example, if it is determined that the size of the to-be-transmitted uplink data packet is less than the second transmission threshold, the terminal device may quickly transmit the uplink data packet on the first uplink carrier, or may quickly transmit the uplink data packet on the SUL carrier.

For example, a quick transmission threshold of UL data of an NR UL is 100 bits, and a quick transmission threshold of UL data of an SUL is 50 bits. If a size of an uplink data packet to be transmitted by the terminal device is less than 50 bits, the terminal device may quickly transmit the uplink data packet on the NR UL or the SUL. If a size of an uplink data packet to be transmitted by the terminal device is 80 bits, which is greater than 50 bits but less than 100 bits, the terminal device may choose to quickly transmit the uplink data packet on the NR UL.

Optionally, in some embodiments, if the uplink data transmission threshold sent by the network device to the terminal device includes only the second transmission threshold, it may be understood as that the first uplink carrier does not support quick transmission of a data packet, and only the SUL carrier supports quick transmission of a data packet. In this embodiment, the terminal device may determine whether the size of the to-be-transmitted uplink data packet is less than the second transmission threshold. If it is determined that the size of the to-be-transmitted uplink data packet is less than the second transmission threshold, the terminal device may quickly transmit the uplink data packet on the SUL carrier. If it is determined that the size of the to-be-transmitted uplink data packet is greater than the second transmission threshold, the terminal device may be configured to be in the connected state, and then perform data transmission. In other words, when the to-be-transmitted uplink data packet is relatively large, the quick transmission solution in this embodiment may not be used.

In certain embodiments of this application, the terminal device can quickly transmit the uplink data packet in an SUL carrier scenario.

For ease of description, the following uses an example in which the first network device is the target base station and a second network device is a source base station for description.

It should be noted that the first network device and the second network device may be a same network device, or may be different network devices. This is not specifically limited in embodiments of this application.

Optionally, in some embodiments, when the size of the uplink data packet to be transmitted by the terminal device is less than or equal to a smaller one of the first transmission threshold and the second transmission threshold, in other words, the size of the uplink data packet to be transmitted by the terminal device is less than or equal to min {first transmission threshold, second transmission threshold}, the terminal device may quickly transmit the uplink data packet on the first uplink carrier, or may quickly transmit the uplink data packet on the SUL carrier. In this case, the terminal device may further determine, based on a downlink signal quality threshold, the first uplink carrier or the SUL carrier on which the uplink data packet is quickly transmitted. Alternatively, when the first transmission threshold is greater than the second transmission threshold, the size of the to-be-transmitted uplink data packet is less than the first transmission threshold but greater than the second transmission threshold, the terminal device may further determine, based on a downlink signal quality threshold, whether the uplink data packet may be quickly transmitted on the first uplink carrier.

Optionally, the network device may send the downlink signal quality threshold to the terminal device, or the network device sends, to the terminal device, information used by the terminal device to determine the downlink signal quality threshold, for example, a quality offset. The terminal device may determine the downlink signal quality threshold based on the quality offset and an existing quality threshold. Refer to FIG. 2. If the terminal device measures that cell quality of the target base station is higher than the downlink signal quality threshold, it means that the terminal device may be within uplink coverage of the NR UL 210 and the SUL 220. The terminal device may further select, based on the first transmission threshold and the second transmission threshold, the NR UL 210 or the SUL 220 on which the uplink data packet is quickly transmitted. If the terminal device measures that cell quality of the target base station is lower than the downlink signal quality threshold, it means that the terminal device may be within uplink coverage of only the SUL 220. The terminal device may further determine, based on the second transmission threshold, whether the uplink data packet may be quickly transmitted on the SUL 220. Optionally, the uplink coverage in this application may be uplink coverage supporting quick transmission.

It should be understood that, when the terminal device determines, by using the downlink signal quality threshold, that the terminal device may be within the uplink coverage of the NR UL 210 and the SUL 220, and determines, by using the transmission threshold, that the size of the uplink data packet to be transmitted by the terminal device is less than or equal to the smaller one of the first transmission threshold and the second transmission threshold, the terminal device may choose to quickly transmit the uplink data packet on the NR UL 210, or may choose to quickly transmit the uplink data packet on the SUL 220. A specific selection mechanism may be based on a configuration of the network device or a predefinition of a protocol. In an example, if the terminal device determines, by using the quality threshold and the transmission threshold, that the terminal device may choose to quickly transmit the uplink data packet on the NR UL 210 or the SUL 220, the network device may send indication information based on a load status on the NR UL 210 or the SUL 220, to indicate the terminal device to preferentially select a carrier frequency (the NR UL 210 or the SUL 220) for quick uplink data transmission.

It should be noted that a sequence in which the terminal device determines, by using the downlink signal quality threshold and the uplink data transmission threshold, to quickly transmit the uplink data packet on the NR UL 210 or the SUL 220 is not specifically limited in the embodiments of this application.

In an example, the terminal device may first determine, based on the uplink data transmission threshold, that the uplink data packet may be quickly transmitted on the NR UL 210 or the SUL 220, and then determine, based on the downlink signal quality threshold, the NR UL 210 or the SUL 220 on which the uplink data packet is quickly transmitted.

For example, assuming that the first transmission threshold is greater than the second transmission threshold and the size of the uplink data packet to be transmitted by the terminal device is greater than the second transmission threshold but less than the first transmission threshold, the terminal device may first determine, based on the uplink data transmission threshold, that the uplink data packet may be quickly transmitted on the NR UL 210. The terminal device further determines, based on the downlink signal quality threshold, whether the terminal device may quickly transmit the uplink data packet on the NR UL 210.

In another example, the terminal device may first determine, based on the downlink signal quality threshold, whether the terminal device is within uplink coverage of the NR UL 210. If the terminal device is within the uplink coverage of the NR UL 210 and the SUL 220, the terminal device determines, based on the uplink data transmission threshold, that the uplink data packet may be quickly transmitted on the NR UL 210 or the SUL 220.

In embodiments of this application, when there are a plurality of carriers, the terminal device can select a proper carrier to transmit uplink data. Optionally, the embodiments of this application are applicable to a terminal device in an idle state, a terminal device in an inactive state, a terminal device in an enhanced idle state, or any other terminal device that is not in a connected state.

An implementation of quickly transmitting the uplink data packet by the terminal device is not specifically limited in embodiments of this application.

In an example, the terminal device may send the to-be-transmitted uplink data packet on the first uplink carrier or the SUL carrier based on a random access configuration. For example, the terminal device may send a message 1 and the to-be-transmitted uplink data packet based on the random access configuration. For another example, the terminal device sends a message 1 (msg 1) based on the random access configuration, and the target base station determines, based on the received message 1, that the terminal device needs to send the uplink data packet. For another example, the terminal device sends a message 3 (msg 3) and the to-be-transmitted uplink data packet. For another example, the terminal device sends a message 3 (msg 3), where the message 3 may carry the to-be-transmitted uplink data packet. The message 3 includes an information element, and the information element may be used to indicate that the message 3 carries the to-be-transmitted uplink data packet. For another example, the terminal device sends a message 5 (msg 5) and the to-be-transmitted uplink data packet. For another example, the terminal device sends a message 5 (msg 5), where the message 5 may carry the to-be-transmitted uplink data packet. The message 5 includes an information element, and the information element may be used to indicate that the message 5 carries the to-be-transmitted uplink data packet. It should be understood that the target base station may send the random access configuration to the terminal device before the terminal device initiates a random access request. The random access configuration is a random access configuration used by the terminal device to perform random access when the terminal device initiates quick uplink data transmission. The msg 5 may be an RRC establishment complete message, an RRC resume complete message, an RRC reestablishment complete message, or another message.

In an implementation, that the terminal device sends the message 1 and the to-be-transmitted uplink data packet based on the random access configuration may be understood as that the terminal device may send the message 1 and the to-be-transmitted uplink data packet on a same uplink grant resource. That the terminal device sends the message 3 and the to-be-transmitted uplink data packet based on the random access configuration may be understood as that the terminal device may send the message 3 and the to-be-transmitted uplink data packet on a same uplink grant resource. That the terminal device sends the message 5 and the to-be-transmitted uplink data packet based on the random access configuration may be understood as that the terminal device may send the message 5 and the to-be-transmitted uplink data packet on a same uplink grant resource.

In embodiments of this application, the random access configuration may include but is not limited to at least one of the following: random access preamble information and a random access resource. The random access resource may include indication information of a time-frequency resource (for example, a physical random access channel (PRACH) resource) used to send a preamble. The random access preamble information includes but is not limited to at least one of the following: a preamble index, used to allocate a preamble resource; indication information of a root sequence, used to generate a preamble; indication information of a maximum quantity of preamble transmission times; indication information of a receive window for a response to the message 1 (MSG 1), where the MSG 1 generally refers to a preamble; indication information of a power ramping step of a preamble; indication information of a subcarrier spacing of a preamble; and indication information of a scaling factor of a backoff indication, used to determine a delay before the terminal device initiates preamble retransmission when random access is not completed.

It should be understood that the msg 1 may be a preamble sent by the terminal device in a random access procedure. The msg 3 may be a radio resource control (RRC) message sent in the random access procedure, and the RRC message is a message sent after a random access response (RAR) sent by the network device is received.

To support a larger coverage depth and better capacity performance, a coverage enhancement (CE) mechanism is introduced into a communications system. The coverage enhancement mechanism may include different CE levels, to indicate signal quality of uplink and downlink carriers at different locations.

Optionally, the different CE levels may correspond to different quantities of repetition times and/or modulation schemes. The network device and the terminal device may repeatedly send or receive uplink and downlink data based on a quantity of repetition times corresponding to a CE level. For example, for an area with a relatively high CE level, a quantity of repetition times of transmitting uplink and/or downlink data of the terminal device may be reduced or uplink and/or downlink data may not be repeatedly sent. For an area with a relatively low CE level, a quantity of repetition times of transmitting uplink and/or downlink data of the terminal device may be increased.

FIG. 4 is a schematic diagram of a CE level according to an embodiment of this application. When a CE mechanism is used, a plurality of CE levels may be used to represent a coverage status or a coverage capability of a carrier, where the coverage status of the carrier may be represented by using signal quality. As shown in FIG. 4, as an example instead of a limitation, the CE mechanism may include CE levels 0 to 3. The CE level 0 to the CE level 3 sequentially correspond to signal quality in descending order. For example, the CE level 0 corresponds to a case of optimal signal quality, and the CE level 3 corresponds to a case of worst signal quality. It should be understood that the CE level may alternatively correspond to the signal quality by using another association relationship. For example, the CE levels 0 to 3 may sequentially correspond to signal quality in ascending order. In this embodiment, an example in which the CE levels 0 to 3 sequentially correspond to the signal quality in descending order is used for description. In addition, more or fewer CE levels may also be used to represent a signal coverage capability. This is not limited in embodiments of this application.

A terminal device may compare actually measured downlink signal quality of a serving cell with a CE level quality threshold. In an example embodiment, the CE level quality threshold may be obtained by using a system message broadcast by a network device. The CE level quality threshold may include at least one threshold. For example, for the foregoing four CE levels, there may be three CE level quality thresholds. Assume that the foregoing three quality thresholds are respectively as follows: a threshold 1=100, a threshold 2=60, and a threshold 3=30. When the measured downlink signal quality is higher than 100, a CE level is the CE level 0. When the downlink signal quality is lower than 100 but higher than 60, a CE level is the CE level 1, and so on.

With reference to the CE mechanism, the foregoing uplink data transmission threshold may include at least one uplink data transmission threshold corresponding to at least one CE level, and/or the foregoing random access configuration may include at least one random access configuration corresponding to at least one CE level.

Specifically, an example in which the uplink data transmission threshold includes the at least one uplink data transmission threshold corresponding to the at least one CE level is used. The network device may send, to the terminal device, the at least one uplink data transmission threshold corresponding to the at least one CE level, and the terminal device may determine a current CE level of the terminal device based on a result of comparing the actually measured downlink signal quality of the serving cell with the CE level quality threshold. The terminal device may determine, based on the current CE level and the at least one uplink data transmission threshold corresponding to the at least one CE level and by comparing a size of a to-be-transmitted uplink data packet with an uplink data transmission threshold corresponding to the current CE level, to perform quick transmission on an NR UL carrier or an SUL carrier.

In this embodiment, to support a larger coverage depth and better capacity performance, the coverage enhancement CE mechanism is introduced into a communications system. The coverage enhancement mechanism may include different CE levels, to indicate signal quality of uplink and downlink carriers at different locations.

In this embodiment, when sending the to-be-transmitted uplink data packet to a target base station, the terminal device may perform, by using a key, encryption or encryption and integrity protection on the uplink data packet that needs to be quickly transmitted. In an example, the terminal device may perform, by using a key related to the target base station, encryption on the uplink data packet that needs to be quickly transmitted. In another example, the terminal device may perform, by using a key related to a source base station, encryption on the uplink data packet that needs to be quickly transmitted.

Optionally, in some embodiments, when the terminal device may support no change of an anchor base station (where the anchor base station is a base station that configures the terminal device to enter an inactive state), according to the technical solutions provided in the embodiments of this application, the anchor base station may not be changed in a data transmission process (to be specific, the terminal device may perform, by using the key related to the source base station, encryption on the uplink data packet that needs to be quickly transmitted), thereby avoiding unnecessary signaling overheads caused by a change of the anchor base station. It may be understood that the anchor base station may also be referred to as the source base station.

The following describes in detail the technical solutions in the embodiments of this application. In the embodiments of this application, a source base station and a target base station are merely examples of a network device or an access network device, and specific device names of the network device or the access network device are not limited in the embodiments of this application.

When initiating location update (for example, radio access network notification area update (RNAU)), a terminal device in an inactive state may support no change of an anchor base station.

It should be understood that, after accessing a network, the terminal device receives configuration information sent by the source base station, and enters the inactive state, and the source base station may store context information of the terminal device. If the terminal device in the inactive state initiates random access to another network device (for example, the target base station), the source base station may determine, based on a reason why the terminal device in the inactive state accesses the network, whether the context information of the terminal device needs to be forwarded to the current target base station of the terminal device. If the source base station does not forward the context information of the terminal device, it may be understood that the source base station still maintains a context of the terminal device, in other words, the terminal device in the inactive state may not change the source base station. A mechanism in which the source base station is not changed can avoid unnecessary signaling overheads caused because the terminal device changes the source base station.

In the embodiments of this application, after determining, based on a transmission threshold and a downlink signal quality threshold, to quickly transmit an uplink data packet in an NR UL 210 or an SUL 220, the terminal device may quickly transmit the uplink data packet by using a key related to the source base station. In this way, signaling overheads and a relatively large data transmission delay that are caused by changes of the anchor base station can be avoided for the terminal in an inactive state.

A specific implementation in which the terminal device quickly transmits the uplink data packet by using the key related to the source base station is not limited in the embodiments of this application. In an example, the target base station may send first indication information to the terminal device, to indicate the terminal device to use the key related to the source base station in a quick uplink data transmission process. To be specific, when the terminal device receives the first indication information, the terminal device performs, by using the key related to the source base station, encryption or encryption and integrity protection on the uplink data that needs to be quickly transmitted. When the terminal device does not receive the first indication information, the terminal device performs, by using a key related to the target base station, encryption or encryption and integrity protection on the uplink data that needs to be quickly transmitted. In another example, the terminal device may determine to perform, by using the key related to the source base station, encryption or encryption and integrity protection on the uplink data that needs to be quickly transmitted. Optionally, the terminal device may send second indication information to the target base station, to indicate the terminal device to perform, by using the key related to the source base station in a quick uplink data transmission process, encryption or encryption and integrity protection on the uplink data that needs to be quick transmitted.

It should be understood that the key related to the source base station mentioned in the embodiments of this application is not specifically limited. In an example, the key related to the source base station may be a key that has been used by the terminal device for the source base station. In another example, the key related to the source base station may be a key determined by the terminal device based on a key that has been used for the source base station and cell information of the target base station, and the cell information may include frequency channel number information and/or a physical cell identifier of a cell. Optionally, the key related to the source base station may be a key determined by the terminal device through horizontal derivation based on the key that has been used for the source base station and the cell information of the target base station. In the embodiments of this application, the key that has been used for the source base station may also be referred to as a previous key, and the key related to the target base station is referred to as a new key.

In the embodiments of this application, after receiving the to-be-transmitted uplink data packet sent by the terminal device by using the key related to the source base station, the target base station may send the to-be-transmitted uplink data packet to the source base station.

An implementation process in which the target base station sends the to-be-transmitted uplink data packet to the source base station is not specifically limited in the embodiments of this application. Optionally, in some embodiments, the target base station may send indication information to the source base station, and the indication information may be used to request the source base station to send a data packet receiving address. After receiving the data packet receiving address sent by the source base station, the target base station may send the to-be-transmitted uplink data packet to the source base station based on the receiving address. Optionally, in some embodiments, the target base station may directly include the to-be-transmitted uplink data packet in signaling (where the signaling may be, for example, a "terminal device context obtaining request" message) sent to the source base station. The following provides detailed descriptions with reference to FIG. 5.

It should be noted that the foregoing embodiments may be implemented independently, or may be combined with each other.

Figure 5:
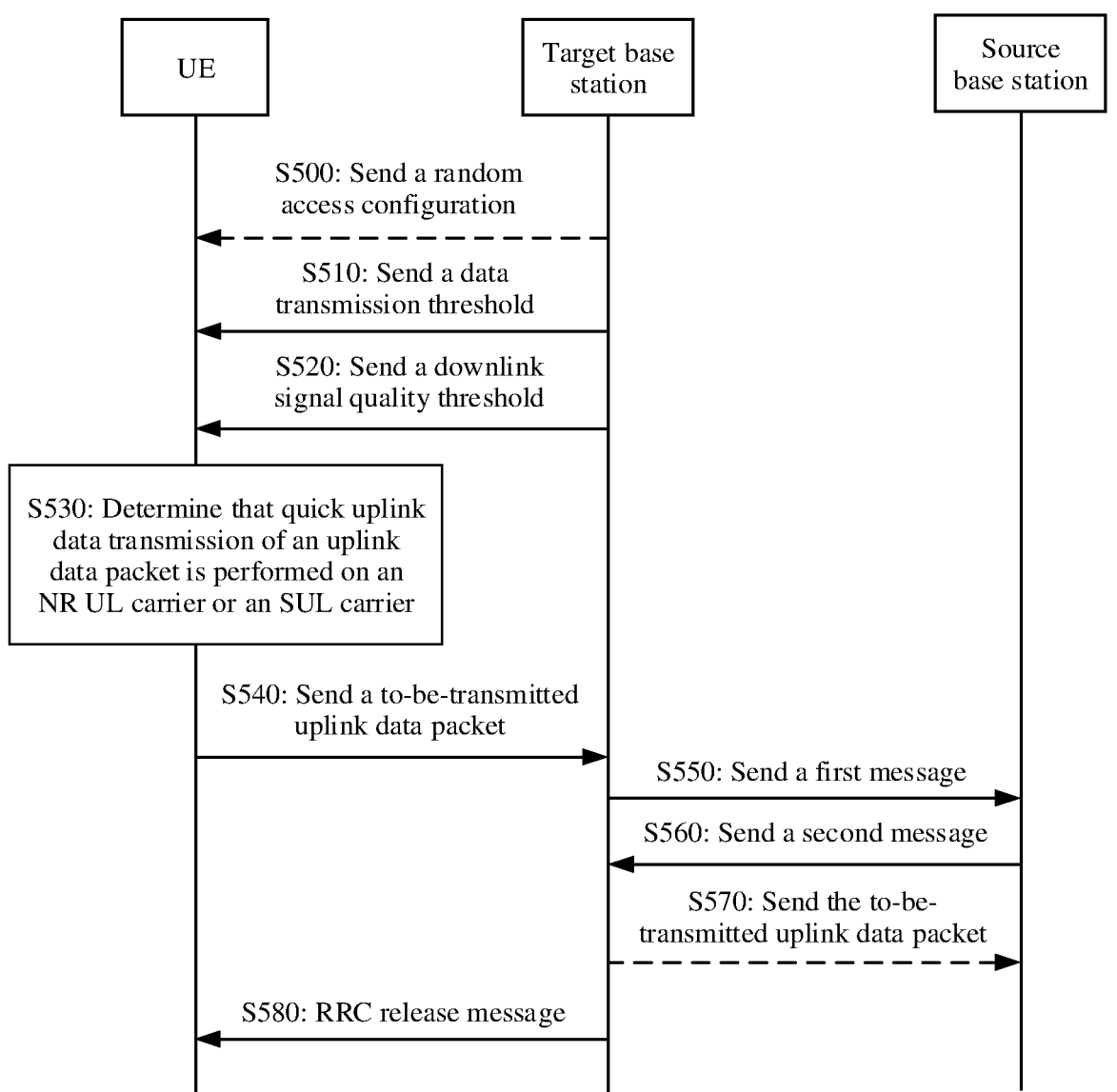
FIG. 5 is an example schematic flowchart of a method for quickly transmitting an uplink data packet according to an embodiment of this application.

With reference to a specific embodiment in FIG. 5, the following describes a non-limiting exemplary process of quickly transmitting an uplink data packet by using an example in which a first uplink carrier is an NR carrier. It should be noted that the example in FIG. 5 is merely intended to help a person skilled in the art understand the embodiments of this application, instead of limiting the embodiments of this application to a specific value or a specific scenario shown in the example. A person of ordinary skill in the art can clearly make various equivalent modifications or changes according to the example shown in FIG. 5, and such modifications or changes also fall within the scope of the embodiments of this application.

FIG. 5 is an exemplary schematic flowchart of a method for quickly transmitting an uplink data packet according to an embodiment of this application. The flowchart in FIG. 5 may include steps S500 to S580. The following respectively describes steps S500 to S580 in detail.

It should be understood that a target base station in FIG. 5 corresponds to the first network device in the foregoing description, and a source base station corresponds to the second network device in the foregoing description.

It should be noted that the target base station and the source base station may be a same base station, or may be different base stations.

Step S500: The target base station sends a random access configuration to UE.

It may be understood that step S500 is an optional step.

Herein, the random access configuration may be a physical random access channel (PRACH) configuration, and the random access configuration may be a random access configuration used for random access when the terminal device initiates quick uplink data transmission. When initiating, to the target base station, random access used for quick uplink data transmission, the UE may initiate a random access request to the target base station by using a PRACH resource reserved by the target base station.

In an example, in a scenario in which there is only an NR UL carrier, the random access configuration may be a random access configuration used for quick transmission on the NR UL carrier. In another example, in a scenario in which there is an NR UL carrier and an SUL carrier, the random access configuration may include a first random access configuration used for quick transmission on the NR UL carrier and a second random access configuration used for quick transmission on the SUL carrier.

It should be noted that, in the scenario in which there is the NR UL carrier and the SUL carrier, the first random access configuration and the second random access configuration may be respectively used on the NR UL carrier and the SUL carrier to quickly transmit an uplink data packet, or may share one random access configuration. This is not specifically limited in embodiments of this application.

Optionally, if a coverage enhancement mechanism is considered, the first random access configuration includes at least one first random access configuration corresponding to at least one CE level of the NR UL carrier, and the second random access configuration includes at least one second random access configuration corresponding to at least one CE level of the SUL carrier.

As shown in FIG. 4, as an example instead of a limitation, the CE mechanism may include CE levels 0 to 3. For example, a random access resource includes only a preamble. A preamble corresponding to a CE level 0 is 0, a preamble corresponding to a CE level 1 is 1, a preamble corresponding to a CE level 2 is 2, and a preamble corresponding to a CE level 3 is 3.

Step S510: The target base station sends a data transmission threshold to the UE.

The target base station may send the data transmission threshold to the UE. The data transmission threshold may be used by the UE to determine whether a to-be-transmitted uplink data packet may be quickly transmitted.

The data transmission threshold is not specifically limited in the embodiments of this application. In an example, in the scenario in which there is only the NR UL carrier, the data transmission threshold may be a maximum size of a data packet that can be quickly transmitted by the UE on the NR UL carrier. In another example, in the scenario in which there is the NR UL carrier and the SUL carrier, the data transmission threshold may include a first transmission threshold and a second transmission threshold, or may include only a second transmission threshold. The first transmission threshold is used to indicate a maximum size of a data packet supported by the terminal device in a non-connected state on the NR UL carrier. The second transmission threshold is used to indicate a maximum size of a data packet supported by the terminal device in the non-connected state on the SUL carrier.

Optionally, if the coverage enhancement mechanism is considered, the first transmission threshold includes at least one transmission threshold corresponding to the at least one CE level of the NR UL carrier, and the at least one second transmission threshold includes a transmission threshold corresponding to the at least one CE level of the SUL carrier.

As shown in FIG. 4, as an example instead of a limitation, the CE mechanism may include the CE levels 0 to 3. A transmission threshold corresponding to the CE 0 is 100 bits, a transmission threshold corresponding to the CE 1 is 80 bits, a transmission threshold corresponding to the CE 2 is 60 bits, and a transmission threshold corresponding to the CE 3 is 30 bits. The first transmission threshold may include at least one of the 100 bits, the 80 bits, the 60 bits, and the 30 bits. The second transmission threshold may include at least one of the 100 bits, the 80 bits, the 60 bits, and the 30 bits.

Step S520: The target base station sends a downlink signal quality threshold to the UE.

Alternatively, the target base station may further send a downlink signal quality offset to the UE.

Optionally, if the coverage enhancement mechanism is considered, the downlink signal quality threshold or the downlink signal quality offset includes at least one downlink signal quality threshold or at least one downlink signal quality offset corresponding to at least one CE level.

It may be understood that a sequence of performing steps S500, S510, and S520 is not limited in embodiments of this application, and the three steps may alternatively be simultaneously performed.

It should be noted that, in step S500, the random access configuration sent by the target base station to the UE may be reserved by the target base station for the UE in advance, and the UE may quickly transmit the uplink data packet by using the reserved random access configuration. Optionally, in some embodiments, if the target base station does not reserve, for the UE, a dedicated random access configuration for quickly transmitting the uplink data packet, the UE may quickly transmit the uplink data packet by using another random access configuration.

Step S530: The UE determines, based on the downlink signal quality threshold and the data transmission threshold, that quick uplink data transmission of the uplink data packet is performed on the NR UL carrier or the SUL carrier.

It may be understood that, if the coverage enhancement mechanism is considered, the UE determines a corresponding data transmission threshold based on a CE level of the UE.

For details, refer to the foregoing descriptions. Details are not repeated herein.

Step S540: The UE sends the to-be-transmitted uplink data packet to the target base station.

After determining, in step S530, that quick uplink data transmission is performed on the NR UL carrier or the SUL carrier, the UE may send the to-be-transmitted uplink data packet on the NR UL carrier or the SUL carrier based on the random access configuration.

In an example, the terminal device may send the to-be-transmitted uplink data packet based on the random access configuration. For example, the terminal device may send a message 1 and the to-be-transmitted uplink data packet based on the random access configuration. For another example, the terminal device sends a message 1 (msg 1) based on the random access configuration, and the target base station determines, based on the received message 1, that the terminal device needs to send the uplink data packet. For another example, the terminal device sends a message 3 (msg 3) and the to-be-transmitted uplink data packet. For another example, the terminal device sends a message 3 (msg 3), where the message 3 carries the to-be-transmitted uplink data packet. The message 3 includes an information element, and the information element may be used to indicate that the message 3 carries the to-be-transmitted uplink data packet. For another example, the terminal device sends a message 5 (msg 5) and the to-be-transmitted uplink data packet. For another example, the terminal device sends a message 5 (msg 5), where the message 5 carries the to-be-transmitted uplink data packet. The message 5 includes an information element, and the information element may be used to indicate that the message 5 carries the to-be-transmitted uplink data packet. It should be understood that the target base station may send the random access configuration to the terminal device before the terminal device initiates the random access request. The random access configuration is a random access configuration used by the terminal device to perform random access when the terminal device initiates quick uplink data transmission.

Optionally, the UE may send the uplink data packet to the target base station based on the random access configuration. Encryption or encryption and integrity protection may be performed on the uplink data packet sent by the UE by using a key related to the source base station. For example, the target base station may indicate the UE to quickly transmit the uplink data packet by using the key related to the source base station. Alternatively, the UE may determine to quickly transmit the uplink data packet by using the key related to the source base station. For details, refer to the foregoing descriptions. Details are not repeated herein.

Step S550: The target base station sends a first message to the source base station.

It may be understood that, when the target base station and the source base station are the same base station, step S550 is an optional step.

Optionally, when the target base station and the source base station are different base stations, the target base station may send the first message to the source base station after determining that the key related to the source base station is used for the to-be-transmitted data packet sent by the UE. The first message may carry third indication information. The third indication information may be used to indicate to the source base station that the UE initiates quick data transmission to the target base station, or the third indication information is used to indicate the source base station to send a receiving address. The target base station may send, to the source base station based on the receiving address, the to-be-transmitted uplink data packet sent by the UE. The first message may be a UE context obtaining request message.

Optionally, in some embodiments, the target base station may further send, to the source base station, the first message directly including the quickly transmitted uplink data packet received from the UE side.

It may be understood that, if the to-be-transmitted uplink data packet is not carried in the first message, the to-be-transmitted uplink data packet may alternatively be forwarded to the source base station in a manner of steps S560 and S570.

Step S560: The source base station sends a second message to the target base station.

It may be understood that, when the target base station and the source base station are the same base station, step S560 is an optional step.

Optionally, when the target base station and the source base station are different base stations, the source base station may send the second message to the target base station.

Optionally, if the first message does not carry the to-be-transmitted uplink data packet, the second message may carry the receiving address of the to-be-transmitted uplink data packet.

The target base station forwards to the source base station, based on the receiving address, the quickly transmitted uplink data packet sent by the UE.

After receiving the third indication information carried in the first message sent by the target base station, the source base station may determine not to change an anchor base station (where the source base station still maintains a UE context), and may further determine, based on the third indication information, that the UE uses the key related to the source base station. For specific descriptions of the key related to the source base station, refer to the foregoing descriptions. Details are not repeated herein.

The second message may be a "UE context obtaining failure" message. The message may carry an RRC release message and receiving address information of the to-be-transmitted uplink data packet.

The source base station generates the RRC release message and performs encryption and/or integrity protection on the RRC release message.

Optionally, if the first message carries the uplink data packet, the second message may be the "UE context obtaining failure" message, and the message carries the RRC release message. The source base station generates the RRC release message and performs encryption and/or integrity protection on the RRC release message.

It should be understood that, when determining not to change the anchor base station, the source base station may send the receiving address of the to-be-transmitted uplink data packet to the target base station, and the target base station may send, to the source base station based on the receiving address, the to-be-transmitted uplink data packet sent by the UE. In addition, the source base station further needs to send the RRC release message to the UE, and the RRC release message may indicate the UE to disconnect from the target base station. The RRC release message needs to be sent by the source base station to the target base station, and is transparently transmitted by the target base station to the UE.

Optionally, step S570: The target base station forwards the to-be-transmitted uplink data packet to the source base station.

It may be understood that, when the target base station and the source base station are the same base station, step S570 is an optional step.

Optionally, when the target base station and the source base station are different base stations, after receiving the receiving address, of the to-be-transmitted uplink data packet, sent by the source base station, the target base station may forward, to the source base station based on the receiving address, the quickly transmitted uplink data packet received from the UE side.

Step S580: The target base station sends the RRC release message to the UE.

After receiving the RRC release message carried in the "UE context obtaining failure" message sent by the source base station, the target base station may forward the RRC release message to the UE.

In this embodiment, when the UE may support quick transmission of the uplink data packet, the UE may not change the anchor base station, thereby avoiding unnecessary signaling overheads and a relatively large data transmission delay caused by a change of the anchor base station.

Optionally, in some embodiments, if the terminal device determines, based on the downlink signal quality threshold and the uplink data transmission threshold, that a quick transmission mechanism cannot be used, to be specific, all to-be-transmitted uplink data packets cannot be sent in one quickly transmitted uplink data packet, the terminal device may transmit data to the target base station (which may be understood as that the terminal device needs to change the anchor base station). The terminal device may transmit the uplink data packet by using a key related to the target base station.

An implementation in which the terminal device may transmit the uplink data packet by using the key related to the target base station is not specifically limited in the embodiments of this application. In an example, the terminal device in the non-connected state may first send the data packet in a quick data transmission manner after determining, based on the transmission threshold and the downlink signal quality threshold, that quick uplink transmission may be performed on an NR UL 210 or an SUL 220, and then send another to-be-transmitted uplink data packet after a switching status of the terminal device is switched to a connected state. In another example, after entering the connected state, the terminal device may send all the to-be-transmitted uplink data packets.

The key that is related to the target base station and used by the terminal device to transmit the uplink data packet is not specifically limited in embodiments of this application. In an example, the key related to the target base station may be a key determined by the terminal device based on a key that has been used for the source base station and cell information of the target base station, and the cell information may include frequency channel number information and/or a physical cell identifier of a cell. In another example, the key related to the target base station may be a key determined by the terminal device based on a key that has been used for the source base station, cell information of the target base station, and a next hop chaining count (NCC) value.

Specifically, the terminal device compares a first NCC (namely, an NCC used before the release message is received, or which may be understood as an NCC corresponding to the key that has been used by the terminal device for the source base station) used by the terminal device for the source base station with a second NCC carried in the release message received from the source base station. If the first NCC is the same as the second NCC, the key related to the target base station may be a key that is related to the target base station and determined by the terminal device based on the key that has been used for the source base station and the cell information of the target base station, namely, a key derived horizontally. If the first NCC is different from the second NCC, the key related to the target base station may be a key determined by the terminal device based on the key that has been used for the source base station, the cell information of the target base station, and the NCC. Specifically, the terminal device may first determine a next-hop key based on the key that has been used for the source base station, the first NCC, and the second NCC, and then determine, based on the next-hop key and the cell information of the target base station, the key related to the target base station, namely, a key derived vertically.

Figure 6:
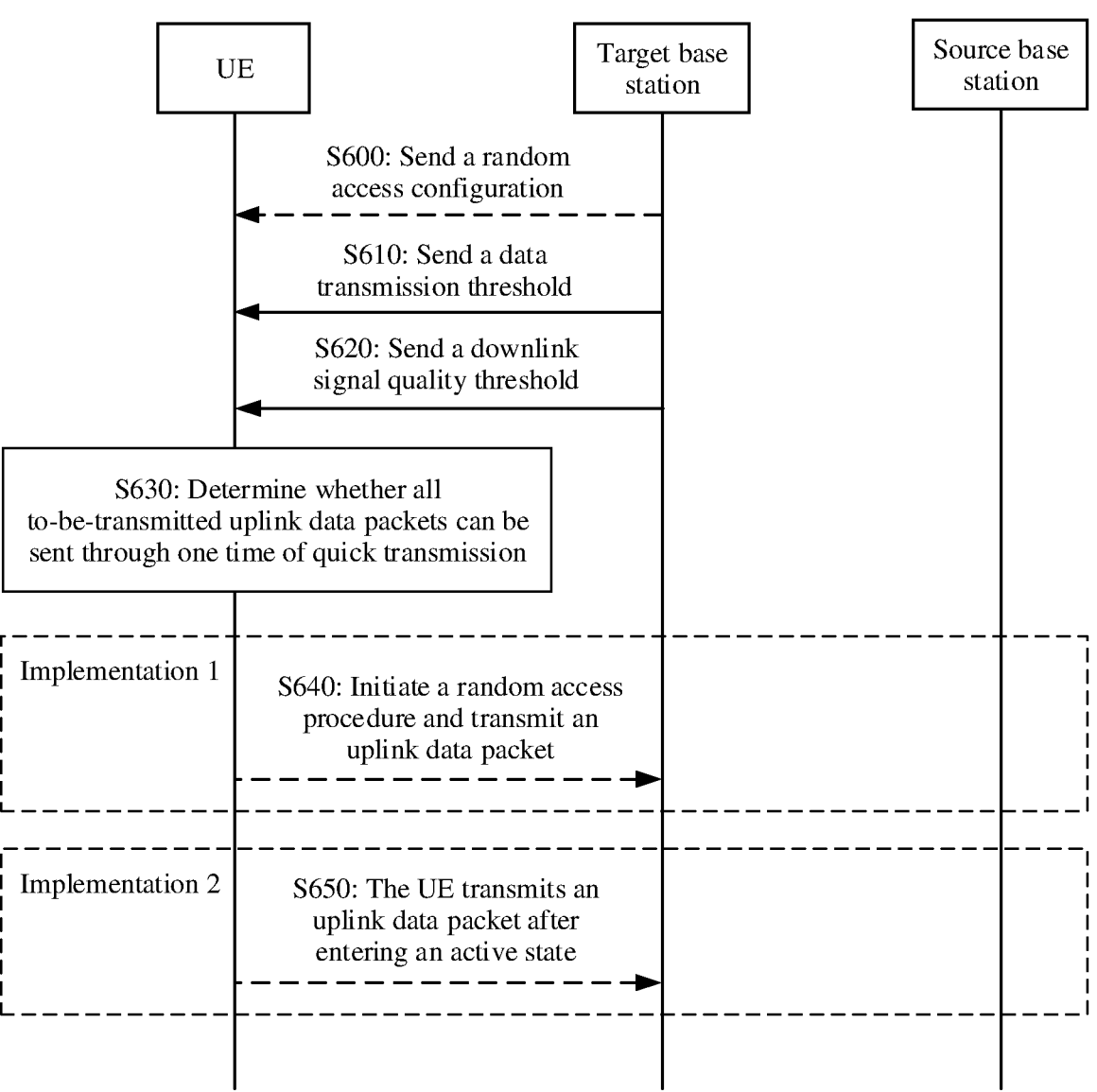
FIG. 6 is an example schematic flowchart of a method for transmitting an uplink data packet according to an embodiment of this application.

With reference to a specific embodiment in FIG. 6, the following describes a non-limiting exemplary process of transmitting an uplink data packet by using an example in which a first uplink carrier is an NR carrier. It should be noted that the example in FIG. 6 is merely intended to help a person of ordinary skill in the art understand this embodiment, instead of limiting embodiments of this application to a specific value or a specific scenario shown in the example. A person of ordinary skill in the art can clearly make various equivalent modifications or changes according to the example shown in FIG. 6, and such modifications or changes also fall within the scope of the embodiments of this application.

FIG. 6 is an example schematic flowchart of a method for transmitting an uplink data packet according to an embodiment of this application. The flowchart in FIG. 6 may include steps S600 to S650. The following respectively describes steps S600 to S650 in detail.

It should be understood that a target base station in FIG. 6 corresponds to the first network device in the foregoing description, and a source base station corresponds to the second network device in the foregoing description.

It should be noted that the target base station and the source base station may be a same base station, or may be different base stations.

Optionally, step S600: The target base station sends a random access configuration to UE.

The step corresponds to step S500. For details, refer to the descriptions in step S500. Details are not repeated herein.

Step S610: The target base station sends a data transmission threshold to the UE.

The step corresponds to step S510. For details, refer to the descriptions in step S510. Details are not repeated herein.

Step S620: The target base station sends a downlink signal quality threshold to the UE.

Alternatively, the target base station may further send a downlink signal quality offset to the UE.

The step corresponds to step S520. For details, refer to the descriptions in step S520. Details are not repeated herein.

It may be understood that a sequence of performing steps S600, S610, and S620 is not limited in embodiments of this application, and the three steps may alternatively be simultaneously performed.

Step S630: The UE determines, based on the downlink signal quality threshold and the data transmission threshold, whether all to-be-transmitted uplink data packets may be sent through quick transmission.

For a specific determining method, refer to the descriptions in step S530. Details are not repeated herein.

If a size of the to-be-transmitted uplink data packet of the UE is greater than a maximum data transmission threshold, it means that all the to-be-transmitted uplink data packets of the UE cannot be entirely sent through one time of quick transmission. Alternatively, when a first transmission threshold is greater than a second transmission threshold, a size of the to-be-transmitted uplink data packet of the UE is greater than the second transmission threshold but less than the first transmission threshold, and the terminal device determines, based on the downlink signal quality threshold, that the terminal device is not within uplink coverage of an NR UL 210, and therefore cannot entirely send all the to-be-transmitted data packets through one time of quick transmission. The target base station may configure the UE to be in a connected state, and the UE may directly transmit data to the target base station. In a process of transmitting the data to the target base station, the UE may protect the to-be-transmitted uplink data packet by using a key related to the target base station. For descriptions of the key related to the target base station, refer to the foregoing descriptions. Details are not repeated herein.

In this embodiment, there may be a plurality of implementations of data transmission between the UE and the target base station. For example, the UE may transmit the first data packet in a quick transmission manner, and then send another to-be-transmitted uplink data packet after a status of the UE is switched to the connected state. For another example, the UE may send all the to-be-transmitted uplink data packets to the target base station after entering the connected state.

Implementation 1: Step S640: The UE initiates a random access procedure to the target base station and transmits the uplink data packet.

In one case, the UE sends the first to-be-transmitted uplink data packet by using a quick transmission mechanism, and then the status is switched to an active state. After entering the active state, the UE may continue to send another to-be-transmitted uplink data packet to the target base station.

Specifically, after the UE may determine, by using the transmission threshold and the downlink signal quality threshold, the first uplink data packet on which quick uplink transmission may be performed on the NR UL 210 or an SUL 220, the UE may first send the first uplink data packet in a non-connected state in a quick data transmission manner.

Optionally, the UE initiates the random access procedure to the target base station based on the random access configuration for uplink data transmission. Correspondingly, the target base station may determine, based on the random access configuration for uplink data transmission, that the UE has initiated the random access procedure for uplink data transmission. Optionally, the UE may send status indication information, and the status indication information is used by the target base station to determine to configure the UE to enter the connected state. The status indication information may indicate that there is still remained to-be-transmitted uplink data packet on the UE side, or may indicate the size of the to-be-transmitted uplink data packet on the UE side.

Implementation 2: Step S650: The UE transmits the uplink data packet after entering an active state.

In another case, when the UE may determine that the size of the to-be-transmitted uplink data packet is greater than a larger one of the first transmission threshold and the second transmission threshold, in other words, the to-be-transmitted uplink data packet of the terminal device is greater than max {first transmission threshold, second transmission threshold}, the network device may configure the UE to enter the active state. After entering the active state, the UE may transmit uplink data to the target base station.

Figure 7:
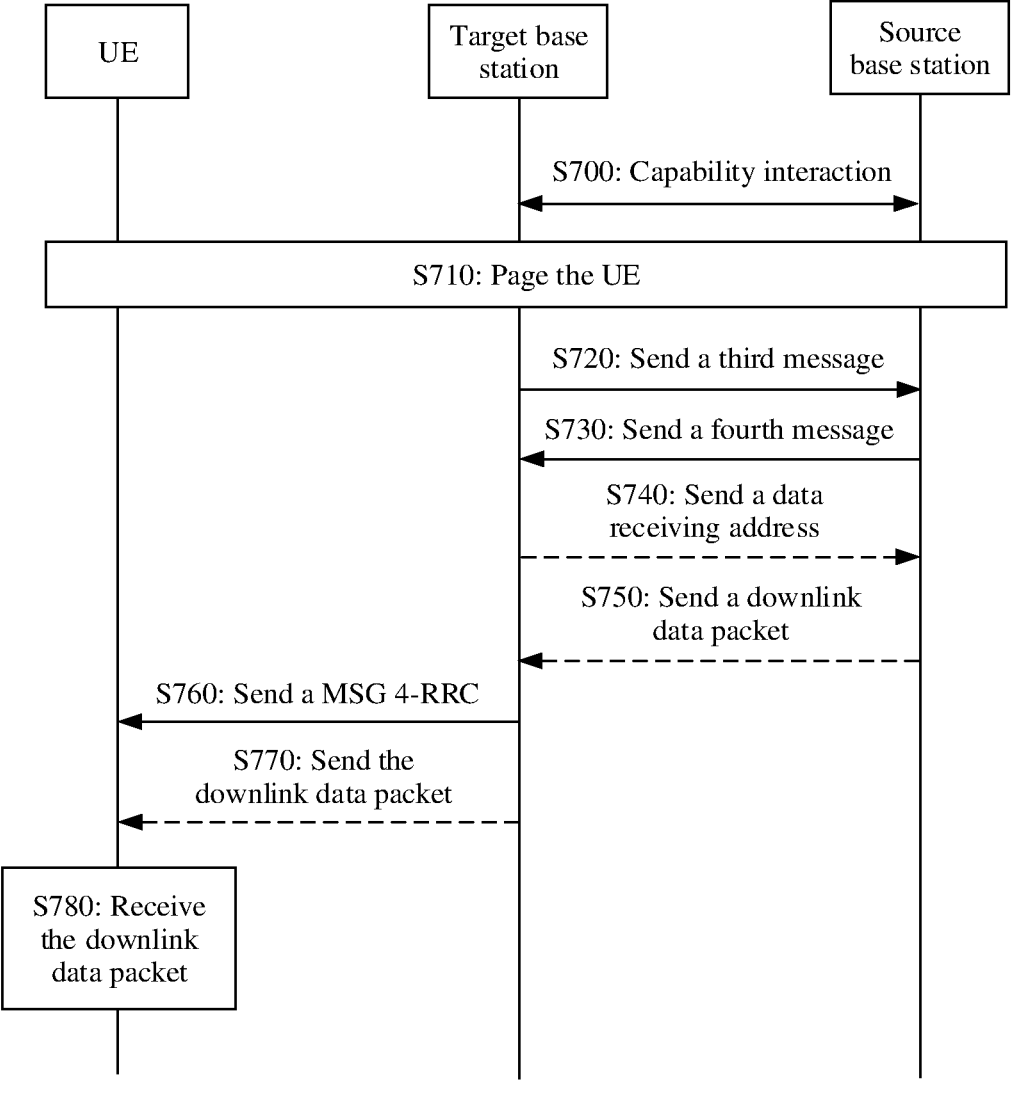
FIG. 7 is an example schematic flowchart of a method for quickly transmitting a downlink data packet according to an embodiment of this application.

With reference to a specific embodiment in FIG. 7, the following describes in more detail an exemplary implementation process of quickly transmitting a downlink data packet in certain embodiments of this application. It should be noted that the example in FIG. 7 is merely intended to help a person of ordinary skill in the art understand this embodiment, instead of limiting the embodiments of this application to a specific value or a specific scenario shown in the example. A person of ordinary skill in the art can clearly make various equivalent modifications or changes according to the example shown in FIG. 7, and such modifications or changes also fall within the scope of the embodiments of this application.

FIG. 7 is an example schematic flowchart of a method for quickly transmitting a downlink data packet according to an embodiment of this application. The flowchart in FIG. 7 may include steps S700 to S780. The following respectively describes steps S700 to S780 in detail.

It should be understood that a target base station in FIG. 7 corresponds to the first network device in the foregoing description, and a source base station corresponds to the second network device in the foregoing description.

It should be noted that the target base station and the source base station may be a same base station, or may be different base stations.

Optionally, step S700: The source base station performs capability interaction with the target base station.

It may be understood that, when the target base station and the source base station are the same base station, step S700 is an optional step.

Optionally, when the target base station and the source base station are different base stations, before a downlink data packet arrives, the source base station may determine whether the target base station has a capability of quickly transmitting the downlink data packet and/or a supported downlink data packet transmission threshold for quick transmission. In an example, if the target base station may support quick transmission of the downlink data packet, after receiving the downlink data packet sent by the source base station, the target base station may directly send the downlink data packet to a terminal device in an inactive state. In another example, if the target base station does not support quick transmission of the downlink data packet, after receiving the downlink data packet sent by the source base station, the target base station may configure a terminal device to enter an active state, and may send the to-be-transmitted downlink data packet to the terminal device after the terminal device enters the active state.

Step S710: The source base station pages the UE.

The source base station may send a "RAN paging" message to page the UE after the downlink data packet arrives.

In a possible manner, the source base station directly initiates RAN paging to the UE within coverage of the source base station.

In another possible manner, the source base station initiates RAN paging to another base station, so that the other base station pages the UE within coverage of the other base station. Optionally, the source base station may include fourth indication information in the paging message sent to the target base station, to indicate that the downlink data packet arrives.

Step S720: The source base station receives a third message sent by the target base station.

It may be understood that, when the target base station and the source base station are the same base station, step S720 is an optional step.

The target base station is a base station that receives a UE paging response. To be specific, before step S720, the target base station receives an access request message of the UE, and the access request message is used to respond to the paging message sent by the target base station to the UE.

Optionally, the third message may include the downlink data packet transmission threshold. The downlink data packet transmission threshold is used to indicate a maximum size, of a downlink data packet for quick data transmission, supported by the target base station.

Optionally, the third message may include a data receiving address of the target base station. The source base station may forward the to-be-transmitted downlink data packet to the target base station based on the receiving address.

It should be understood that the third message in this embodiment may be a UE context obtaining request message.

Step S730: The source base station sends a fourth message to the target base station.

It may be understood that, when the target base station and the source base station are the same base station, step S730 is an optional step.

Optionally, when the target base station and the source base station are different base stations, the source base station may determine, based on the downlink data packet transmission threshold and the to-be-transmitted downlink data, whether to change an anchor base station. The downlink data packet transmission threshold may be set by the source base station, or may be received by the source base station from the target base station. When determining not to change the anchor base station, the source base station may feed back the fourth message to the target base station (for example, send a "UE context obtaining failure" message to the target base station).

It may be understood that the source base station may alternatively determine, based on another factor, whether to change the anchor base station. This is not limited in embodiments of this application. In an example, the anchor base station may determine, based on resource usage of the anchor base station, whether to change the anchor base station for the UE. For example, if a relatively large quantity of resources of the anchor base station are used, the anchor base station may consider changing the anchor base station for the UE. In another example, the anchor base station may further determine, based on a congestion status, whether to change the anchor base station for the UE. For example, if the anchor base station is relatively congested, the anchor base station considers changing the anchor base station for the UE.

Optionally, the source base station may directly include, in the fourth message, the downlink data packet to be transmitted to the UE.

The fourth message may carry an RRC message that is generated by the source base station and on which the source base station performs encryption and/or integrity protection. The RRC message may be an RRC release message.

Optionally, the fourth message may carry an indication information. The indication information may include at least one of fifth indication information, sixth indication information, and seventh indication information. The fifth indication information may be used to indicate the target base station to send the receiving address for receiving the downlink data packet. The sixth indication information may be used to indicate that the terminal device needs to receive the sent downlink data packet. The seventh indication information may be used to indicate that the terminal device needs to decrypt the sent downlink data packet by using a previous key related to the source base station. The sixth indication information and/or the seventh indication information may be carried in the RRC message in the fourth message.

Optionally, step S740: The target base station sends, to the source base station, the receiving address for receiving the downlink data packet.

It may be understood that, when the target base station and the source base station are the same base station, step S740 is an optional step.

Optionally, when the target base station and the source base station are different base stations, the target base station may send a data forwarding address indication message to the source base station.

If the third message sent by the target base station to the source base station in step S720 does not include the receiving address for receiving the downlink data packet by the target base station, the target base station may perform step S740.

Optionally, step S750: The source base station sends the downlink data packet to the target base station.

It may be understood that, when the target base station and the source base station are the same base station, step S750 is an optional step.

Optionally, when the target base station and the source base station are different base stations, after receiving the receiving address, of the downlink data packet, sent by the target base station, the source base station may forward the downlink data packet to the target base station.

If the fourth message sent by the source base station to the target base station in step S740 does not include the downlink data packet, the source base station may perform step S750.

Step S760: The target base station sends an access response message to the UE.

The access response message may include layer 2 control information and an RRC message, or include only an RRC message.

The target base station receives the RRC message in the fourth message sent by the source base station, and may forward the RRC message to the UE as the access response message. Optionally, the RRC message may carry the sixth indication information and/or the seventh indication information.

Optionally, the layer 2 control information may carry the sixth indication information and/or the seventh indication information. The layer 2 control information may be downlink control information (DCI).

Step S770: The target base station sends the downlink data packet to the UE.

Optionally, the target base station may send the downlink data packet to the UE when sending the access response message.

Optionally, the target base station may further send the downlink data packet to the UE after sending the access response message.

Step S780: The UE receives the downlink data packet.

If the UE receives the sixth indication information, the UE may start a timer. If the UE may monitor a PDCCH before the timer expires, the UE may receive, based on scheduling information on the PDCCH, the downlink data packet sent on a physical downlink shared channel (PDSCH), and the UE stops the timer.

Optionally, the UE determines, based on the seventh indication information, to process received downlink data by using a key related to the source base station. For specific descriptions of the key related to the source base station, refer to the foregoing descriptions. Details are not repeated herein.

It may be understood that, in a running time of the timer, the UE stores a temporary cell radio network temporary identifier (C-RNTI) allocated by the target base station in a random access procedure, and monitors the PDCCH by using the stored temporary C-RNTI. After the timer expires or the UE receives the downlink data, the UE deletes the temporary C-RNTI.

It should be further understood that a cell radio network temporary identifier may be a dynamic identifier allocated by a network device to UE, and uniquely identifies the UE served by an air interface of a cell.

In this embodiment, the indication information indicating that there is downlink data transmission may be introduced in a downlink data packet transmission process, to avoid a case in which the terminal device cannot learn of existence of downlink transmission data, thereby avoiding a data pair loss caused by missed reception of the downlink data.

Figures 8, 9:
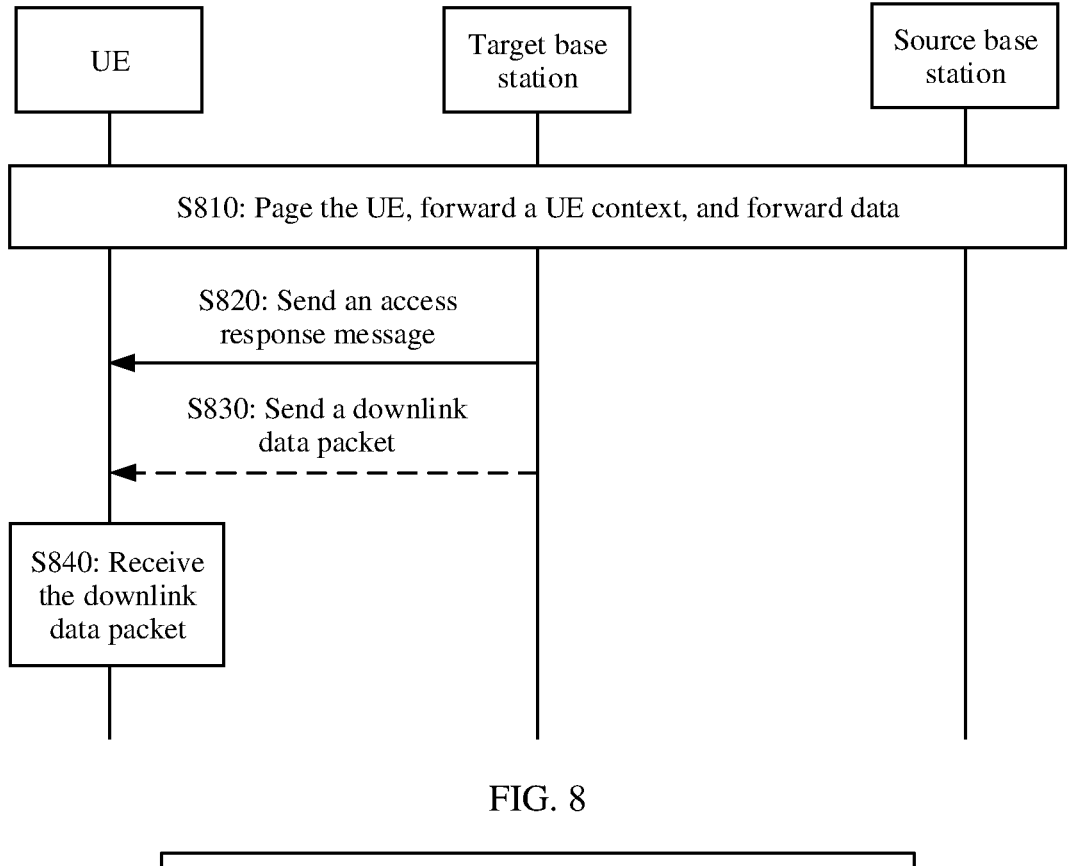
FIG. 8 is an example schematic flowchart of a method for transmitting a downlink data packet according to an embodiment of this application.
FIG. 9 is a schematic block diagram of a communications apparatus 900 according to an embodiment of this application.

With reference to a specific embodiment in FIG. 8, the following describes a non-limiting exemplary process of transmitting a downlink data packet by using an example in which a first uplink carrier is an NR carrier. It should be noted that the example in FIG. 8 is merely intended to help a person of ordinary skill in the art understand this embodiment, instead of limiting the embodiments of this application to a specific value or a specific scenario shown in the example. A person of ordinary skill in the art can clearly make various equivalent modifications or changes according to the example shown in FIG. 8, and such modifications or changes also fall within the scope of the embodiments of this application.

FIG. 8 is an exemplary schematic flowchart of a method for transmitting a downlink data packet according to an embodiment of this application. The flowchart in FIG. 8 may include steps S810 to S840. The following respectively describes steps S810 to S840 in detail.

It should be understood that a target base station in FIG. 8 corresponds to the first network device in the foregoing description, and a source base station corresponds to the second network device in the foregoing description.

It should be noted that the target base station and the source base station may be a same base station, or may be different base stations.

Step S810: The source base station pages UE, forwards a UE context, and forwards data.

It may be understood that, when the target base station and the source base station are the same base station, step S810 is an optional step.

The source base station may send a "RAN paging" message to page the UE after a downlink data packet arrives. For a specific paging mechanism, refer to the descriptions in step S720.

Optionally, when the target base station and the source base station are different base stations, the source base station may send a fourth message to the target base station, and the fourth message carries UE context information. The fourth message may be a UE context obtaining response message. Optionally, the fourth message may further carry indication information. The indication information may include at least one of fifth indication information, sixth indication information, and seventh indication information. For specific descriptions of the fifth indication information, the sixth indication information, and the seventh indication information, refer to the descriptions in step S730.

Optionally, the source base station may directly include the to-be-transmitted downlink data packet of the UE in the fourth message.

It may be understood that, for a mechanism in which the source base station sends the downlink data packet to the target base station and/or a specific implementation process in which the source base station obtains an address, for receiving the downlink data packet, sent by the target base station, refer to the descriptions in the embodiment shown in FIG. 7 in this application. Details are not repeated herein.

It should be understood that the target base station is a base station that receives a UE paging response.

In this embodiment, the source base station determines to change an anchor base station for the UE. Specifically, the source base station may determine, based on a reason for random access of the UE, whether to change the anchor base station for the UE (which may be understood as whether to continue to maintain the UE context). Alternatively, if the to-be-transmitted downlink data packet is less than a downlink data packet transmission threshold, the source base station may determine to change the anchor base station for the UE. Alternatively, when the source base station is congested, the source base station may determine to change the anchor base station for the UE. In this case, the source base station may forward the maintained UE context to the target base station. Herein, the target base station may maintain the UE context, and may be used as a new anchor base station of the UE.

When determining to change the anchor base station for the UE, the source base station may forward the to-be-transmitted downlink data packet to the target base station.

Optionally, in some embodiments, even though the source base station determines that the downlink data packet to be transmitted to the UE may be quickly transmitted, in other words, the source base station may send all to-be-transmitted downlink data packets to the UE at a time, a relatively large quantity of resources of the source base station are used or the source base station is congested. Therefore, the source base station still determines to change the anchor base station for the UE. In this case, after the downlink data packet arrives at the target base station, the target base station only needs to directly send the downlink data packet to the UE.

Step S820: The target base station sends an access response message to the UE.

After receiving the downlink data packet forwarded by the source base station, the target base station may send the access response message to the UE. The access response message may include layer 2 control information and an RRC message, or include only an RRC message. The target base station generates the RRC message and performs encryption and/or integrity protection on the RRC message.

Optionally, the target base station may include the sixth indication information and/or the seventh indication information in the layer 2 control information or the RRC message. The layer 2 control information may be downlink control information (DCI).

Step S830: The target base station sends the downlink data packet to the UE.

Optionally, the target base station may send the downlink data packet to the UE when sending the access response message.

Optionally, the target base station may send the downlink data packet to the UE after sending the access response message.

Step S840: The UE receives the downlink data packet.

If the UE receives the sixth indication information, the UE may start a timer. If the UE may monitor a PDCCH before the timer expires, the UE may receive, based on scheduling information on the PDCCH, the downlink data packet sent on a physical downlink shared channel (PDSCH), and the UE stops the timer.

Optionally, the UE determines, based on the seventh indication information, to process the received downlink data packet by using a key related to the target base station. For specific descriptions of the key related to the target base station, refer to the foregoing descriptions. Details are not repeated herein.

It may be understood that, in a running time of the timer, the UE stores a temporary cell radio network temporary identifier (C-RNTI) allocated by the target base station in a random access procedure, and monitors the PDCCH by using the stored temporary C-RNTI. After the timer expires or the UE receives downlink data, the UE deletes the temporary C-RNTI.

It should be noted that the downlink data transmission embodiment may be independently implemented, or may be implemented by combining with the uplink data transmission embodiments described above. This is not specifically limited in the embodiments of this application.

It may be understood that, in the communications method in the embodiments of this application, the steps implemented by the terminal device may alternatively be implemented by a component (for example, a chip or a circuit) that can be used for the terminal device. The steps implemented by the first network device may alternatively be implemented by a component (for example, a chip or a circuit) that can be used for the first network device. The steps implemented by the second network device may alternatively be implemented by a component (for example, a chip or a circuit) that can be used for the second network device.

The foregoing describes in detail the communications methods provided in the embodiments of this application with reference to FIG. 1 to FIG. 8. The following describes in detail apparatus embodiments of this application with reference to FIG. 9 to FIG. 14. It should be understood that the descriptions of the method embodiments correspond to descriptions of the apparatus embodiments. Therefore, for parts that are not repeated, refer to the foregoing method embodiments.

FIG. 9 is a schematic block diagram of a communications apparatus 900 according to an embodiment of this application. It may be understood that the communications apparatus 900 may be a terminal device, or may be a component that can be used for a terminal device.

The communications apparatus 900 may include a receiving module 910 and a determining module 920.

The receiving module 910 is configured to receive an uplink data transmission threshold from a first network device, where the uplink data transmission threshold includes a first transmission threshold and a second transmission threshold, or includes a second transmission threshold.

The determining module 920 is configured to determine, based on the uplink data transmission threshold and a size of a to-be-transmitted uplink data packet, to quickly transmit, in the non-connected state, the uplink data packet on a first uplink carrier or an SUL carrier of the first network device.

The first network device in this embodiment may be understood as a target base station.

In this embodiment, the first transmission threshold is used to indicate a maximum size of a data packet supported by the communications apparatus 900 in the non-connected state on the first uplink carrier. The second transmission threshold is used to indicate a maximum size of a data packet supported by the communications apparatus 900 in the non-connected state on the supplementary uplink (SUL) carrier. A frequency of the first uplink carrier is higher than that of the SUL carrier, and the first uplink carrier may be, for example, a new radio uplink (NR UL) carrier.

In this embodiment, the uplink data packet can be quickly transmitted in an SUL carrier scenario.

Optionally, in some embodiments, the determining module 920 is specifically configured to: when the second transmission threshold is greater than the first transmission threshold, and the size of the to-be-transmitted uplink data packet is greater than the first transmission threshold and less than the second transmission threshold, quickly transmit the uplink data packet on the SUL carrier of the first network device.

Optionally, in some embodiments, the determining module 920 is specifically configured to quickly transmit, in the non-connected state, the uplink data packet on the first uplink carrier or the SUL carrier when the size of the to-be-transmitted uplink data packet is less than a smaller one of the first transmission threshold and the second transmission threshold.

Optionally, in some embodiments, the determining module 920 is specifically configured to determine to transmit, in the non-connected state, the uplink data packet on the first uplink carrier or the SUL carrier of the first network device when the size of the to-be-transmitted uplink data packet is less than a smaller one of the first transmission threshold and the second transmission threshold.

Optionally, in some embodiments, the determining module 920 performs the following operations through the receiving module 910: receiving a downlink signal quality threshold from the first network device; and determining, based on the downlink signal quality threshold, to transmit, in the non-connected state, the uplink data packet on the first uplink carrier or the SUL carrier.

Optionally, in some embodiments, the apparatus further includes: a sending module 930, configured to send the uplink data packet in the non-connected state by using a random access procedure.

Optionally, in some embodiments, the sending module 930 is specifically configured to: determine to send, in the non-connected state, a message 1 and the to-be-transmitted uplink data packet; or determine to send, in the non-connected state, a message 3 and the to-be-transmitted uplink data packet; or determine to send, in the non-connected state, a message 3, where the message 3 carries the to-be-transmitted uplink data packet; or determine to send, in the non-connected state, a message 5 and the to-be-transmitted uplink data packet; or determine to send, in the non-connected state, a message 5, where the message 5 carries the to-be-transmitted uplink data packet.

Optionally, in some embodiments, the receiving module 910 is specifically configured to receive first indication information from the first network device, where the first indication information is used to indicate the communications apparatus 900 to transmit, in the non-connected state, the uplink data packet by using a first key, and the first key is a key determined by the communications apparatus 900 based on at least one of the following information:

a key used by the communications apparatus 900 for a second network device, where the second network device is a source network device that configures the communications apparatus 900 to enter the non-connected state;

cell information of the first network device, where the cell information includes frequency channel number information and/or a physical cell identifier of a cell of the first network device, and the first network device is a target network device to which the communications apparatus 900 performs random access; and a next hop chaining count (NCC) value.

It may be understood that, for functions and corresponding operations of the modules of the communications apparatus in this embodiment, refer to related descriptions in the method embodiments. In addition, the module in this embodiment may also be referred to as a unit, a circuit, or the like. This is not limited in this embodiment of this application.

In this embodiment, the communications apparatus 900 may quickly transmit the uplink data packet by using a key related to a source base station. In this way, signaling overheads and a relatively large data transmission delay that are caused by changes an anchor base station can be avoided for the communications apparatus 900 in an inactive state.

Optionally, in some embodiments, the receiving module 910 is further configured to receive a random access configuration from the first network device. The communications apparatus 900 determines to transmit, in the non-connected state, the uplink data packet on the first uplink carrier or the SUL carrier based on the random access configuration.

Optionally, in some embodiments, the random access configuration includes at least one of the following: random access preamble information and a random access resource.

Optionally, in some embodiments, the random access configuration includes at least one random access configuration corresponding to at least one coverage enhancement level.

Optionally, in some embodiments, the uplink data transmission threshold includes at least one uplink data transmission threshold corresponding to the at least one coverage enhancement level.

In this embodiment, the foregoing different CE levels may correspond to different maximum quantities of repetition times and/or modulation schemes of data transmission, to achieve a balance between coverage and a capacity.

Figure 10:
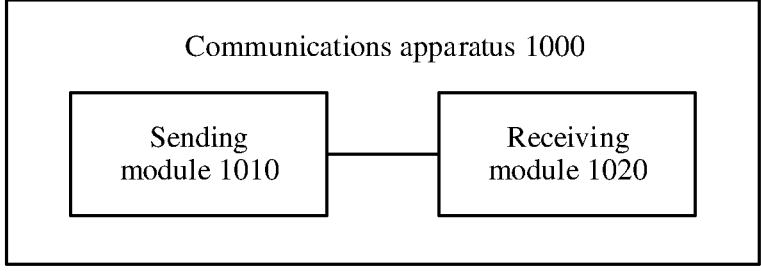
FIG. 10 is a schematic block diagram of a communications apparatus 1000 according to an embodiment of this application.

FIG. 10 is a schematic block diagram of a communications apparatus 1000 according to an embodiment of this application. It may be understood that the communications apparatus 1000 may be a network device, or may be a component that can be used for a network device.

The communications apparatus 1000 may include a sending module 1010 and a receiving module 1020.

The sending module 1010 is configured to send an uplink data transmission threshold to a terminal device, where the uplink data transmission threshold includes a first transmission threshold and a second transmission threshold or includes a second transmission threshold.

The receiving module 1020 is configured to receive, on the first uplink carrier or an SUL carrier, the uplink data packet transmitted by the terminal device in the non-connected state.

The communications apparatus 1000 in this embodiment may be understood as a target base station.

The first transmission threshold is used to indicate a maximum size of a data packet supported by the terminal device in the non-connected state on the first uplink carrier, the second transmission threshold is used to indicate a maximum size of a data packet supported by the terminal device in the non-connected state on the supplementary uplink (SUL) carrier, and a frequency of the first uplink carrier is higher than that of the SUL carrier.

Optionally, in some embodiments, the sending module 1010 is further configured to send a downlink signal quality threshold to the terminal device, where the downlink signal quality threshold is used by the terminal device to determine to transmit, in the non-connected state, the uplink data packet on the first uplink carrier or the SUL carrier.

Optionally, in some embodiments, the sending module 1010 is further configured to send a random access configuration to the terminal device, where the random access configuration is used by the terminal device to determine to transmit, in the non-connected state, the uplink data packet on the first uplink carrier or the SUL carrier based on the random access configuration.

Optionally, in some embodiments, the random access configuration includes at least one of the following: random access preamble information and a random access resource.

Optionally, in some embodiments, the random access configuration includes at least one random access configuration corresponding to at least one coverage enhancement level.

In this embodiment, the foregoing different CE levels may correspond to different maximum quantities of repetition times and/or modulation schemes of data transmission, to achieve a balance between coverage and a capacity.

Optionally, in some embodiments, the sending module 1010 is further configured to send second indication information to the terminal device, where the second indication information is used to indicate the terminal device to transmit, in the non-connected state, the uplink data packet by using the first key.

The first key in this embodiment may be a key determined by the terminal device based on at least one of the following information: a key used by the terminal device for the second network device, where the second network device is a source network device that configures the terminal device to enter the non-connected state; cell information of the first network device, where the cell information includes frequency channel number information and/or a physical cell identifier of a cell of the first network device, and the first network device is a target network device to which the terminal device performs random access; and a next hop chaining count (NCC) value.

In this embodiment, the terminal device may quickly transmit the uplink data packet by using a key related to a source base station. In this way, signaling overheads and a relatively large data transmission delay that are caused by changes of an anchor base station can be avoided for the terminal device in an inactive state.

Optionally, in some embodiments, the receiving module 1020 is further configured to receive a second message sent by the second network device, where the second message includes a receiving address of the uplink data packet. The communications apparatus 1000 forwards to the second network device, based on the receiving address, the received uplink data packet transmitted by the terminal device.

Optionally, in some embodiments, the sending module 1010 is further configured to send a first message to the second network device, where the first message includes third indication information, the third indication information is used to indicate the second network device to send the receiving address, or is used to indicate that the terminal device transmits the uplink data packet by using the first key, the receiving address is an address used by the communications apparatus 1000 to send, to the second network device, the uplink data packet transmitted by the terminal device in the non-connected state.

It may be understood that, for functions and corresponding operations of the modules of the communications apparatus in this embodiment, refer to related descriptions in the method embodiments. In addition, the module in this embodiment may also be referred to as a unit, a circuit, or the like. This is not limited in embodiments of this application.

Figure 11:
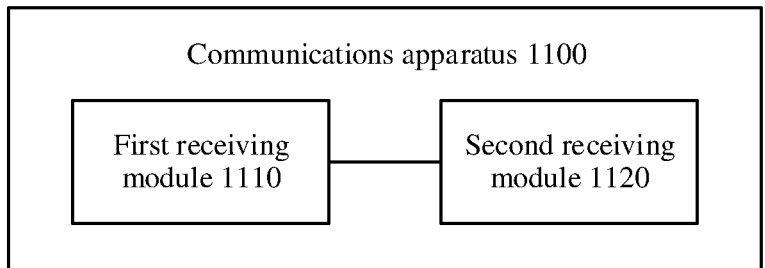
FIG. 11 is a schematic block diagram of a communications apparatus 1100 according to an embodiment of this application.

FIG. 11 is a schematic block diagram of a communications apparatus 1100 according to an embodiment of this application. It may be understood that the communications apparatus 1100 may be a network device, or may be a component that can be used for a network device.

The communications apparatus 1100 in this embodiment may be understood as a source base station, and may correspond to the foregoing second network device.

The communications apparatus 1100 may include a first receiving module 1110 and a second receiving module 1120.

The first receiving module 1110 is configured to receive a to-be-transmitted uplink data packet sent by a first network device.

The second receiving module 1120 is configured to receive third indication information sent by the first network device, where the third indication information is used to indicate that the to-be-transmitted uplink data packet is an uplink data packet sent by a terminal device in a non-connected state on a first uplink carrier or a supplementary uplink (SUL) carrier.

In this embodiment, the uplink data packet can be quickly transmitted in an SUL carrier scenario.

Optionally, in some embodiments, the apparatus 1100 further includes a processing module and a sending module.

The processing module is configured to determine, based on a downlink data transmission threshold and a size of a to-be-transmitted downlink data packet, that the to-be-transmitted downlink data packet needs to be sent to the first network device, where the to-be-transmitted downlink data packet is a downlink data packet that needs to be directly sent by the first network device to the terminal device in the non-connected state.

The sending module is configured to send the to-be-transmitted downlink data packet to the first network device.

Optionally, in some embodiments, the sending module is further configured to send fifth indication information to the first network device, where the fifth indication information is used to indicate the first network device to send a receiving address for receiving the to-be-transmitted downlink data packet.

Optionally, in some embodiments, the sending module is further configured to send sixth indication information to the first network device, where the sixth indication information is used to indicate that the terminal device has the to-be-received downlink data packet in the non-connected state.

Optionally, in some embodiments, the sending module is further configured to send seventh indication information to the first network device, where the seventh indication information is used to indicate that the terminal device decrypts the downlink data packet by using a first key, and the first key is a key determined by the terminal device based on at least one of the following information:

a key used by the terminal device for the second network device, where the second network device is a source network device that configures the terminal device to enter the non-connected state;

cell information of the first network device, where the cell information includes frequency channel number information and/or a physical cell identifier of a cell of the first network device, and the first network device is a target network device to which the terminal device performs random access; and a next hop chaining count (NCC) value.

It may be understood that, for functions and corresponding operations of the modules of the communications apparatus in this embodiment, refer to related descriptions in the method embodiments. In addition, the module in this embodiment may also be referred to as a unit, a circuit, or the like. This is not limited in embodiments of this application.

In this embodiment, the terminal device may quickly transmit the uplink data packet by using a key related to the source base station. In this way, signaling overheads and a relatively large data transmission delay that are caused by changes of an anchor base station can be avoided for the terminal device in an inactive state.

Figure 12:
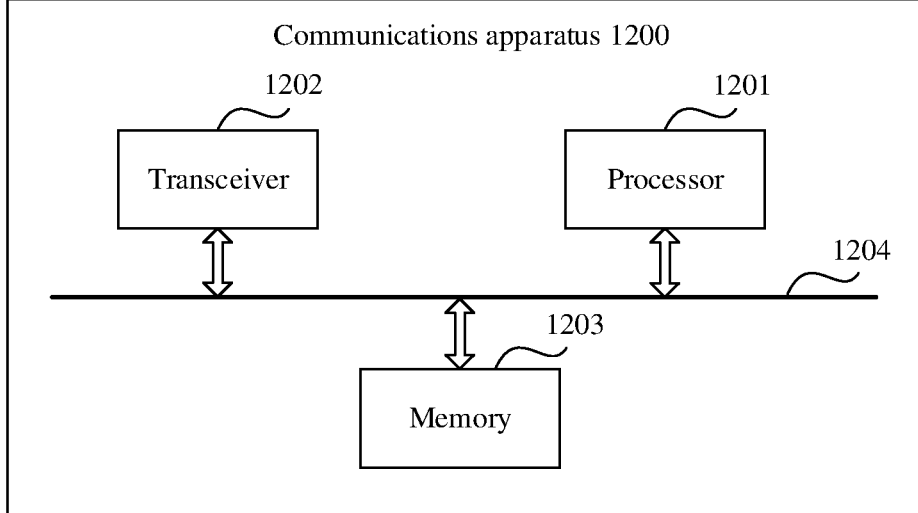
FIG. 12 is a schematic block diagram of a communications apparatus 1200 according to an embodiment of this application.

FIG. 12 is a schematic block diagram of a communications apparatus 1200 according to an embodiment of this application. The communications apparatus 1200 may include a processor 1201, a transceiver 1202, and a memory 1203.

The processor 1201 may be communicatively connected to the transceiver 1202. The memory 1203 may be configured to store program code and data of the communications apparatus 1200. Therefore, the memory 1203 may be a storage unit in the processor 1201, an external storage unit independent of the processor 1201, or a component including a storage unit in the processor 1201 and an external storage unit independent of the processor 1201.

Optionally, the communications apparatus 1200 may further include a bus 1204. The transceiver 1202 and the memory 1203 may be connected to the processor 1201 by using the bus 1204. The bus 1204 may be a peripheral component interconnect (PCI) bus, an extended industry standard structure (EISA) bus, or the like. The bus 1204 may be classified into an address bus, a data bus, a control bus, and the like. For ease of representation, only one thick line is used to represent the bus in FIG. 12, but this does not mean that there is only one bus or only one type of bus.

The processor 1201 may be, for example, a central processing unit (CPU), a general-purpose processor, a digital signal processor (DSP), an application-specific integrated circuit (ASIC), a field programmable gate array (FPGA), or another programmable logic device, a transistor logic device, a hardware component, or any combination thereof. The processor may implement or execute various example logical blocks, modules, and circuits described with reference to content disclosed in this application. The processor may alternatively be a combination of processors implementing a computing function, for example, a combination of one or more microprocessors, or a combination of a DSP and a microprocessor.

The transceiver 1202 may be a circuit including the foregoing antenna, a transmitter chain, and a receiver chain. The transmitter chain and the receiver chain may be independent circuits or a same circuit.

The transceiver 1202 may correspond to the receiving module 910 in FIG. 9, and the transceiver 1202 is configured to perform all steps performed by the receiving module 910 in FIG. 9.

The processor 1201 may correspond to the determining module 920 in FIG. 9. The processor 1201 is configured to perform all steps performed by the processing module 920 in FIG. 9.

It may be understood that, for functions and corresponding operations of the modules of the communications apparatus in this embodiment, refer to related descriptions in the method embodiments. In addition, the module in this embodiment may also be referred to as a unit, a circuit, or the like. This is not limited in embodiments of this application.

Figure 13:
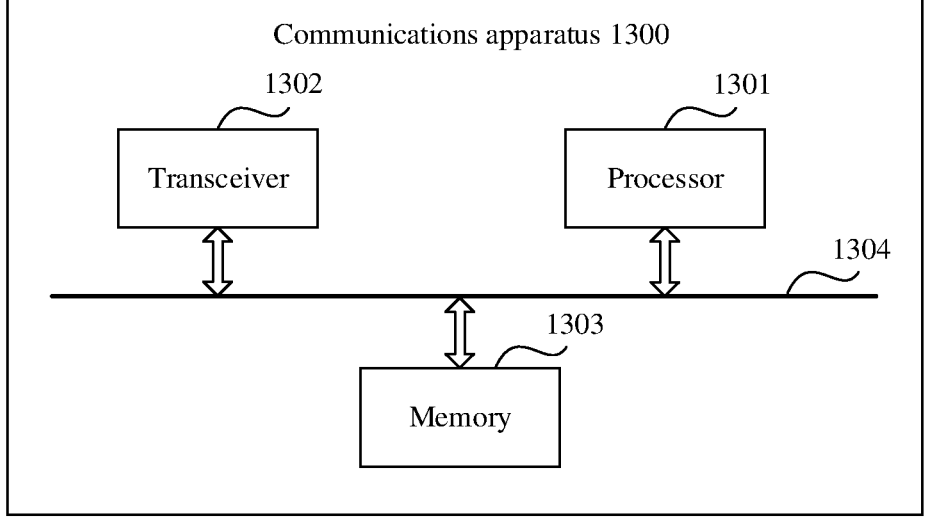
FIG. 13 is a schematic block diagram of a communications apparatus 1300 according to an embodiment of this application.

FIG. 13 is a schematic block diagram of a communications apparatus 1300 according to an embodiment of this application. The communications apparatus 1300 may include a processor 1301, a transceiver 1302, and a memory 1303.

The processor 1301 may be communicatively connected to the transceiver 1302. The memory 1303 may be configured to store program code and data of the communications apparatus 1300. Therefore, the memory 1303 may be a storage unit in the processor 1301, an external storage unit independent of the processor 1301, or a component including a storage unit in the processor 1301 and an external storage unit independent of the processor 1301.

Optionally, the communications apparatus 1300 may further include a bus 1304. The transceiver 1302 and the memory 1303 may be connected to the processor 1301 by using the bus 1304. The bus 1304 may be a peripheral component interconnect (PCI) bus, an extended industry standard structure (EISA) bus, or the like. The bus 1304 may be classified into an address bus, a data bus, a control bus, and the like. For ease of representation, only one thick line is used to represent the bus in FIG. 13, but this does not mean that there is only one bus or only one type of bus.

The processor 1301 may be, for example, a central processing unit (CPU), a general-purpose processor, a digital signal processor (DSP), an application-specific integrated circuit (ASIC), a field programmable gate array (FPGA), or another programmable logic device, a transistor logic device, a hardware component, or any combination thereof. The processor may implement or execute various example logical blocks, modules, and circuits described with reference to content disclosed in this application. The processor may alternatively be a combination of processors implementing a computing function, for example, a combination of one or more microprocessors, or a combination of a DSP and a microprocessor.

The transceiver 1302 may be a circuit including the foregoing antenna, a transmitter chain, and a receiver chain, and may be independent circuits or a same circuit.

The transceiver 1302 is configured to send an uplink data transmission threshold to a terminal device, where the uplink data transmission threshold includes a first transmission threshold and a second transmission threshold, or includes a second transmission threshold.

The transceiver 1302 is configured to receive, on a first uplink carrier or an SUL carrier, an uplink data packet transmitted by the terminal device in a non-connected state.

The transceiver 1302 corresponds to the sending module 1010 and the receiving module 1020 in FIG. 10. The transceiver 1302 is configured to perform all steps performed by the sending module 1010 and the receiving module 1020 in FIG. 10.

Figure 14:
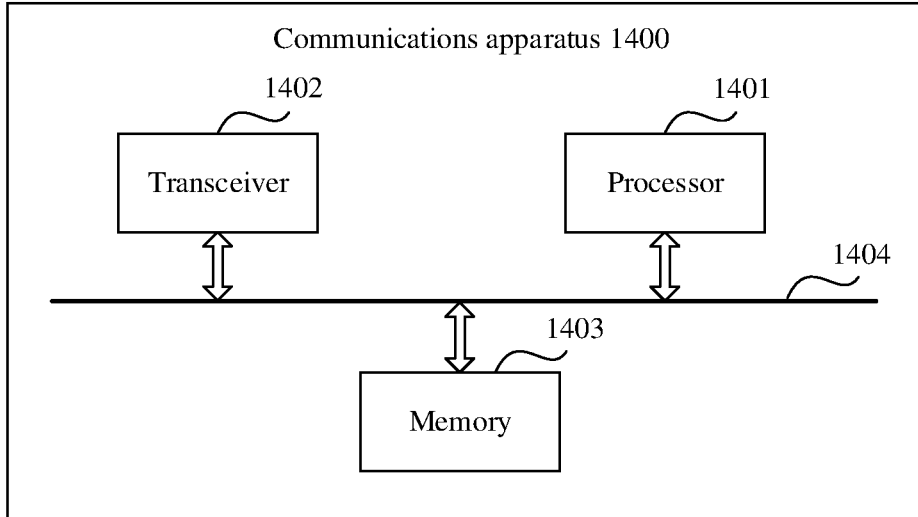
FIG. 14 is a schematic block diagram of a communications apparatus 1400 according to an embodiment of this application.

FIG. 14 is a schematic block diagram of a communications apparatus 1400 according to an embodiment of this application. The communications apparatus 1400 may include a processor 1401, a transceiver 1402, and a memory 1403.

The processor 1401 may be communicatively connected to the transceiver 1402. The memory 1403 may be configured to store program code and data of the communications apparatus 1400. Therefore, the memory 1403 may be a storage unit in the processor 1401, an external storage unit independent of the processor 1401, or a component including a storage unit in the processor 1401 and an external storage unit independent of the processor 1401.

Optionally, the communications apparatus 1400 may further include a bus 1404. The transceiver 1402 and the memory 1403 may be connected to the processor 1401 by using the bus 1404. The bus 1404 may be a peripheral component interconnect (PCI) bus, an extended industry standard structure (EISA) bus, or the like. The bus 1404 may be classified into an address bus, a data bus, a control bus, and the like. For ease of representation, only one thick line is used to represent the bus in FIG. 14, but this does not mean that there is only one bus or only one type of bus.

The processor 1401 may be, for example, a central processing unit (CPU), a general-purpose processor, a digital signal processor (DSP), an application-specific integrated circuit (ASIC), a field programmable gate array (FPGA), or another programmable logic device, a transistor logic device, a hardware component, or any combination thereof. The processor may implement or execute various example logical blocks, modules, and circuits described with reference to content disclosed in this application. The processor may alternatively be a combination of processors implementing a computing function, for example, a combination of one or more microprocessors, or a combination of a DSP and a microprocessor.

The transceiver 1402 may be a circuit including the foregoing antenna, a transmitter chain, and a receiver chain, and may be independent circuits or a same circuit.

The transceiver 1402 is configured to receive a to-be-transmitted uplink data packet sent by a first network device.

The transceiver 1402 is configured to receive first indication information sent by the first network device, where the first indication information is used to indicate that the to-be-transmitted uplink data packet is an uplink data packet sent by a terminal device in a non-connected state on a first uplink carrier or a supplementary uplink (SUL) carrier.

The transceiver 1402 corresponds to the first receiving module 1110 and the second receiving module 1120 in FIG. 11. The transceiver 1402 is configured to perform all steps performed by the first receiving module 1110 and the second receiving module 1120 in FIG. 11.

It may be understood that, for functions and corresponding operations of the modules of the communications apparatus in this embodiment, refer to related descriptions in the method embodiments. In addition, the module in this embodiment may also be referred to as a unit, a circuit, or the like. This is not limited in embodiments of this application.

It may be understood that the terminal device or the network device may perform some or all of the steps in the foregoing embodiments. These steps or operations are merely examples. In this embodiment, other operations or variations of various operations may be further performed. In addition, the steps may be performed in a sequence different from that presented in the foregoing embodiments, and not all the operations in the foregoing embodiments are necessarily performed.

An embodiment of this application further provides a computer-readable medium, configured to store a computer program. The computer program includes instructions used to perform the method in any embodiment of any one of the foregoing aspects.

An embodiment of this application further provides a computer program product, used in a terminal device. The computer program product includes computer program code. When the computer program code is executed by a computer, the computer is enabled to perform the method in any embodiment of any one of the foregoing aspects.

An embodiment of this application further provides a chip system, used in a communications device. The chip system includes: at least one processor, at least one memory, and an interface circuit. The interface circuit is responsible for information exchange between the chip system and an external environment. The at least one memory, the interface circuit, and the at least one processor are connected to each other by using a line. The at least one memory stores instructions. The instructions are executed by the at least one processor, to perform operations of the network element in the methods in the foregoing aspects.

An embodiment of this application further provides a computer program product, used in a communications device. The computer program product includes a series of instructions. When the instructions are executed, operations of the network element in the methods in the foregoing aspects are performed.

In addition, the terms "system" and "network" may be used interchangeably in this specification. The term "and/or" in this specification describes only an association relationship for associated objects and represents that three relationships may exist. For example, A and/or B may represent one of: Only A exists, both A and B exist, or only B exists. In addition, the character "/" in this specification usually represents an "or" relationship between the associated objects.

It should be understood that in the embodiments of this application, "B corresponding to A" indicates that B is associated with A, and B may be determined based on A. However, it should be further understood that determining B based on A does not mean that B is determined based on A only; to be specific, B may alternatively be determined based on A and other information.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD), a semiconductor medium (for example, a solid-state drive (solid state disk, SSD)), or the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person of ordinary skill in the art that, for the purpose of convenient and brief description, for a detailed working process of the foregoing system, apparatus, and unit, refer to a corresponding process in the foregoing method embodiments. Details are not repeated herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electrical, mechanical, or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely non-limiting examples of specific implementations of this application, and are not intended to limit the protection scope, which is intended to cover any variation or replacement readily determined by a person of ordinary skill in the art. Therefore, the claims shall define the protection scope.

What is claimed is:

1. A communications method, comprising:

receiving an uplink data transmission threshold and a downlink signal quality threshold from a first network device, wherein the first network device is a target network device to which a terminal device performs random access, the uplink data transmission threshold indicates a maximum size of a data packet and is used in determining to transmit, in a non-connected state, uplink data packet on a first uplink carrier or a supplementary uplink (SUL) carrier, and a frequency of the first uplink carrier is higher than that of the SUL carrier;

in a case that a data volume of a to-be-transmitted uplink data packet is less than or equal to the uplink data transmission threshold, selecting, based on the down-link signal quality threshold, the first uplink carrier or the SUL carrier to transmit, in the non-connected state, the uplink data packet; and receiving first information wherein the first information indicates a first next hop chaining count (NCC) for determining a first key used for transmitting the uplink data packet in the non-connected state, wherein the first key is a key derived horizontally in a case that the first NCC is the same as a second NCC, and the second NCC is a NCC used before the first NCC is received, wherein the method further comprises;

receiving a random access configuration from the first network device; and the selecting, based on the downlink signal quality thresh-old, the first uplink carrier or the SUL carrier to transmit, in the non-connected state, the uplink data packet comprises:

determining to transmit, in the non-connected state, the uplink data packet on the first uplink carrier or the SUL carrier of the first network device based on the random access configuration, wherein the random access configuration comprises at least one random access configuration corresponding to at least one coverage enhancement level, wherein the uplink data transmission threshold comprises at least one uplink data transmission threshold corre-sponding to the at least one coverage enhancement level.

2. The method according to claim 1, wherein the select-ing, based on the downlink signal quality threshold, the first uplink carrier or the SUL carrier to transmit, in the non-connected state, the uplink data packet comprises:

determining whether the uplink data transmission thresh-old comprises only a second transmission threshold and whether the data volume of the to-be-transmitted uplink data packet is less than the second transmission thresh-old, wherein the second transmission threshold indi-cates a maximum size of a data packet in the non-connected state on the supplementary uplink (SUL) carrier; and upon determination that the uplink data transmission threshold comprises only the second transmission threshold and the data volume of the to-be-transmitted uplink data packet is less than the second transmission threshold, determining to transmit, in the non-con-nected state, the uplink data packet on the SUL carrier.

3. The method according to claim 1, wherein the uplink data transmission threshold comprises both a first transmis-sion threshold and a second transmission threshold, the second transmission threshold is greater than the first trans-mission threshold, and the selecting, based on the downlink signal quality threshold, the first uplink carrier or the SUL carrier to transmit, in the non-connected state, the uplink data packet comprises:

determining whether the data volume of the to-be-trans-mitted uplink data packet is greater than the first transmission threshold and less than the second trans-mission threshold; and upon determination that the data volume of the to-be-transmitted uplink data packet is greater than the first transmission threshold and less than the second trans-mission threshold, determining, by the terminal device, to transmit, in the non-connected state, the uplink data packet on the SUL carrier, wherein the first transmission threshold indicates a maxi-mum size of a data packet in the non-connected state on the first uplink carrier, and the second transmission threshold indicates a maximum size of a data packet in the non-connected state on the supplementary uplink (SUL) carrier.

4. The method according to claim 1, wherein the uplink data transmission threshold comprises both a first transmis-sion threshold and a second transmission threshold, the selecting, based on the downlink signal quality threshold, the first uplink carrier or the SUL carrier to transmit, in the non-connected state, the uplink data packet comprises:

determining whether the data volume of the to-be-trans-mitted uplink data packet is less than a smaller one of the first transmission threshold and the second trans-mission threshold; and upon determination that the data volume of the to-be-transmitted uplink data packet is less than the smaller one of the first transmission threshold and the second transmission threshold, determining to transmit, in the non-connected state, the uplink data packet on either the first uplink carrier or the SUL carrier, wherein the first transmission threshold indicates a maxi-mum size of a data packet in the non-connected state on the first uplink carrier, and the second transmission threshold indicates a maximum size of a data packet in the non-connected state on the supplementary uplink (SUL) carrier.

5. The method according to claim 1, wherein the select-ing, based on the downlink signal quality threshold, the first uplink carrier or the SUL carrier to transmit, in the non-connected state, the uplink data packet comprises:

determining to send, in the non-connected state, the uplink data packet by using a random access procedure.

6. The method according to claim 5, wherein the deter-mining to send, in the non-connected state, the uplink data packet by using a random access procedure comprises:

determining to send, in the non-connected state, a first message and the to-be-transmitted uplink data packet;

determining to send, in the non-connected state, a second message and the to-be-transmitted uplink data packet; or determining to send, in the non-connected state, the second message, wherein the second message carries the to-be-transmitted uplink data packet.

7. The method according to claim 1, wherein the first key is determined by the terminal device based on at least one of: a key used by the terminal device for a second network device, cell information of the first network device, or a next hop chaining count (NCC) value, the second network device is a network device that configures the terminal device to enter the non-connected state, the cell information com-prises frequency channel number information and/or a physical cell identifier of a cell of the first network device, and the first network device is a target network device to which the terminal device performs random access.

8. The method according to claim 1, wherein the first key is a key derived vertically in a case that the first NCC is different from the second NCC.

9. A communications method, applied for a first network device and comprising:

sending an uplink data transmission threshold and a downlink signal quality threshold to a terminal device, wherein the terminal device performs random access to the first network device, the uplink data transmission threshold indicates a maximum size of a data packet and is used in determining to transmit, in a non-connected state, uplink data packet on a first uplink carrier or a supplementary uplink (SUL) carrier, and a frequency of the first uplink carrier is higher than that of the SUL carrier;

receiving, on the first uplink carrier or the SUL carrier which is determined based on the downlink signal quality threshold in a case that a data volume of a to-be-transmitted uplink data packet is less than or equal to the uplink data transmission threshold, an uplink data packet transmitted by the terminal device in the non-connected state; and sending first information to the terminal device, wherein the first information indicates a first next hop chaining count (NCC) for determining a first key used for transmitting the uplink data packet in the non-connected state, wherein the first key is a key derived horizontally in a case that the first NCC is the same as a second NCC, and the second NCC is a NCC used before the first NCC is received, wherein the first key is determined by the terminal device based on at least one of: a key used by the terminal device for a second network device, cell information of a first network device, or a next hop chaining count (NCC) value, the second network device is a network device that configures the terminal device to enter the non-connected state, the cell information comprises frequency channel number information and/or a physical cell identifier of a cell of the first network device, and the first network device is a target network device to which the terminal device performs random access, wherein the method further comprises:

receiving a second message sent by a second network device, wherein the second message comprises a receiving address of the uplink data packet; and forwarding, to the second network device based on the receiving address, the received uplink data packet transmitted by the terminal device.

10. The method according to claim 9, further comprising:

sending a random access configuration to the terminal device, wherein the random access configuration is used by the terminal device to determine to transmit, in the non-connected state, the uplink data packet on the first uplink carrier or the SUL carrier based on the random access configuration.

11. The method according to claim 10, wherein the random access configuration comprises at least one random access configuration corresponding to at least one coverage enhancement level.

12. The method according to claim 9, further comprising:

before receiving the second message sent by the second network device, sending a first message to the second network device, wherein the first message indicates the second network device to send the address for receiving the uplink data packet, or indicates that the terminal device transmits the uplink data packet by using the first key determined by the terminal device, and the receiving address of the uplink data packet is an address that is sent by the second network device and that is of the uplink data packet transmitted by the terminal device in the non-connected state.

13. The method according to claim 9, wherein the first key is a key derived vertically in a case that the first NCC is different from the second NCC.

14. A communications apparatus comprising:

at least one processor; and a memory configured to store computer readable instructions that, when executed by the at least one processor, cause the apparatus to perform operations comprising:

receiving an uplink data transmission threshold and a downlink signal quality threshold from a first network device, wherein the first network device is a target network device to which the communications apparatus performs random access, the uplink data transmission threshold indicates a maximum size of a data packet supported by a terminal device and is used in determining to transmit, in a non-connected state, uplink data packet on a first uplink carrier or a supplementary uplink (SUL) carrier, and a frequency of the first uplink carrier is higher than that of the SUL carrier;

in a case that a data volume of a to-be-transmitted uplink data packet is less than or equal to the uplink data transmission threshold, selecting, based on the downlink signal quality threshold, the first uplink carrier or the SUL carrier to transmit, in the non-connected state, the uplink data packet; and receiving first information, wherein the first information indicates a first next hop chaining count (NCC) for determining a first key used for transmitting the uplink data packet in the non-connected state, wherein the first key is a key derived horizontally in a case that the first NCC is the same as a second NCC, and the second NCC is a NCC used before the first NCC is received, wherein the operations further comprise:

receiving a random access configuration from the first network device; and the selecting, based on the downlink signal quality threshold, the first uplink carrier or the SUL carrier to transmit, in the non-connected state, the uplink data packet comprises:

determining to transmit, in the non-connected state, the uplink data packet on the first uplink carrier or the SUL carrier of the first network device based on the random access configuration, wherein the random access configuration comprises at least one random access configuration corresponding to at least one coverage enhancement level, and wherein the uplink data transmission threshold comprises at least one uplink data transmission threshold corresponding to the at least one coverage enhancement level.

15. The communications apparatus according to claim 14, wherein the selecting, based on the downlink signal quality threshold, the first uplink carrier or the SUL carrier to transmit, in the non-connected state, the uplink data packet comprises:

determining whether the uplink data transmission threshold comprises only a second transmission threshold and whether the data volume of the to-be-transmitted uplink data packet is less than the second transmission threshold, wherein the second transmission threshold indicates a maximum size of a data packet in the non-connected state on the supplementary uplink (SUL) carrier; and upon determination that the uplink data transmission threshold comprises only the second transmission threshold and the data volume of the to-be-transmitted uplink data packet is less than the second transmission threshold, determining to transmit, in the non-connected state, the uplink data packet on the SUL carrier.

16. The communications apparatus according to claim 14, wherein the uplink data transmission threshold comprises both a first transmission threshold and a second transmission threshold, the second transmission threshold is greater than the first transmission threshold, and the selecting, based on the downlink signal quality threshold, the first uplink carrier or the SUL carrier to transmit, in the non-connected state, the uplink data packet comprises:

determining whether the data volume of the to-be-transmitted uplink data packet is greater than the first transmission threshold and less than the second transmission threshold; and upon determination that the data volume of the to-be-transmitted uplink data packet is greater than the first transmission threshold and less than the second transmission threshold, determining, by the terminal device, to transmit, in the non-connected state, the uplink data packet on the SUL carrier, wherein the first transmission threshold indicates a maximum size of a data packet in the non-connected state on the first uplink carrier, and the second transmission threshold indicates a maximum size of a data packet in the non-connected state on the supplementary uplink (SUL) carrier.

17. The communications apparatus according to claim 14, wherein the uplink data transmission threshold comprises both a first transmission threshold and a second transmission threshold, the selecting, based on the downlink signal quality threshold, the first uplink carrier or the SUL carrier to transmit, in the non-connected state, the uplink data packet comprises:

determining whether the data volume of the to-be-transmitted uplink data packet is less than a smaller one of the first transmission threshold and the second transmission threshold; and upon determination that the data volume of the to-be-transmitted uplink data packet is less than the smaller one of the first transmission threshold and the second transmission threshold, determining to transmit, in the non-connected state, the uplink data packet on either the first uplink carrier or the SUL carrier, wherein the first transmission threshold indicates a maximum size of a data packet in the non-connected state on the first uplink carrier, and the second transmission threshold indicates a maximum size of a data packet in the non-connected state on the supplementary uplink (SUL) carrier.

18. The communications apparatus according to claim 14, wherein the selecting, based on the downlink signal quality threshold, the first uplink carrier or the SUL carrier to transmit, in the non-connected state, the uplink data packet comprises:

determining to send, in the non-connected state, the uplink data packet by using a random access procedure.

19. The communications apparatus according to claim 18, wherein the determining to send, in the non-connected state, the uplink data packet by using a random access procedure comprises:

determining to send, in the non-connected state, a first message and the to-be-transmitted uplink data packet;

determining to send, in the non-connected state, a second message and the to-be-transmitted uplink data packet; or determining to send, in the non-connected state, the second message, wherein the second message carries the to-be-transmitted uplink data packet.

20. The communications apparatus according to claim 14, wherein the first key is determined by the terminal device based on at least one of: a key used by the terminal device for a second network device, cell information of the first network device, or a next hop chaining count (NCC) value, the second network device is a network device that configures the terminal device to enter the non-connected state, the cell information comprises frequency channel number information and/or a physical cell identifier of a cell of the first network device, and the first network device is a target network device to which the terminal device performs random access.

21. The communications apparatus according to claim 14, wherein the first key is a key derived vertically in a case that the first NCC is different from the second NCC.

* * * * *